United States Patent
Smith et al.

(10) Patent No.: US 10,306,663 B2
(45) Date of Patent: May 28, 2019

(54) METHOD AND SYSTEM FOR SHARING RADIOFREQUENCY SPECTRUM FOLLOWING A CONTENTION BASED PROTOCOL WITH DETERMINATION OF TRANSMISSION TIME DURATION

(71) Applicant: Telefonaktiebolaget LM Ericsson (publ), Stockholm (SE)

(72) Inventors: Roland Smith, Nepean (CA); Mike Skof, Nepean (CA)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

(21) Appl. No.: 15/575,738

(22) PCT Filed: Jul. 2, 2015

(86) PCT No.: PCT/IB2015/055003
§ 371 (c)(1),
(2) Date: Nov. 20, 2017

(87) PCT Pub. No.: WO2016/189362
PCT Pub. Date: Dec. 1, 2016

(65) Prior Publication Data
US 2018/0124807 A1 May 3, 2018

Related U.S. Application Data

(60) Provisional application No. 62/165,427, filed on May 22, 2015.

(51) Int. Cl.
*H04W 72/12* (2009.01)
*H04W 16/14* (2009.01)
(Continued)

(52) U.S. Cl.
CPC ....... *H04W 72/1215* (2013.01); *H04W 16/14* (2013.01); *H04W 74/0808* (2013.01); *H04W 74/0816* (2013.01); *H04W 88/10* (2013.01)

(58) Field of Classification Search
None
See application file for complete search history.

(56) References Cited

U.S. PATENT DOCUMENTS

| | | | |
|---|---|---|---|
| 2012/0076074 A1 | 3/2012 | Park et al. | |
| 2014/0321305 A1* | 10/2014 | Lee | H04W 72/0446 370/252 |

(Continued)

OTHER PUBLICATIONS

Author Unknown, "Technical Specification Group Radio Access Network; Study on Licensed-Assisted Access to Unlicensed Spectrum (Release 13)," Technical Report 36.889, Version 0.4.0, 3GPP Organizational Partners, Apr. 2015, 45 pages.

(Continued)

*Primary Examiner* — German Viana Di Prisco
(74) *Attorney, Agent, or Firm* — Withrow & Terranova, PLLC

(57) ABSTRACT

A method and system for time-sharing radiofrequency spectrum resources between at least two wireless networks where the transmission time duration of a network node configured to control transmissions in a first wireless network is adjusted based on the estimated number of active wireless devices operating in a second wireless network. The shared channel is accessed following a contention based, CSMA/CD, protocol, In one aspect, a method is provided for the network node which includes after a first wireless network transmission in the first wireless network, determining a start time of a contention-based transmission in the second wireless network, estimating a number of active wireless devices operating in the second wireless network based on the start time, and adjusting a transmission time (Continued)

duration for a subsequent first wireless network transmission based on the number of active wireless devices estimated.

29 Claims, 14 Drawing Sheets

(51) Int. Cl.
*H04W 74/08* (2009.01)
*H04W 88/10* (2009.01)

(56) References Cited

U.S. PATENT DOCUMENTS

2015/0085683 A1    3/2015  Sadek et al.
2015/0163823 A1*   6/2015  Sadek ............... H04W 72/1215
                                              370/336
2015/0341961 A1*  11/2015  Kim ................. H04W 74/0808
                                              370/338
2016/0286548 A1*   9/2016  Huang ................. H04L 5/0007

OTHER PUBLICATIONS

Ghazvini, Mandieh et al., "Game Theory Applications in CSMA Methods," IEEE Communications Surveys & Tutorials, vol. 15, No. 3, Jul. 2013, IEEE, pp. 1062-1087.
Mediatek Inc., "R1-153260: LBT Design for LAA," 3GPP Organizational Partners, May 25-29, 2015, 4 pages, Fukuoka, Japan.
International Search Report and Written Opinion for International Patent Application No. PCT/IB2015/055003, dated Feb. 25, 2016, 11 pages.

\* cited by examiner

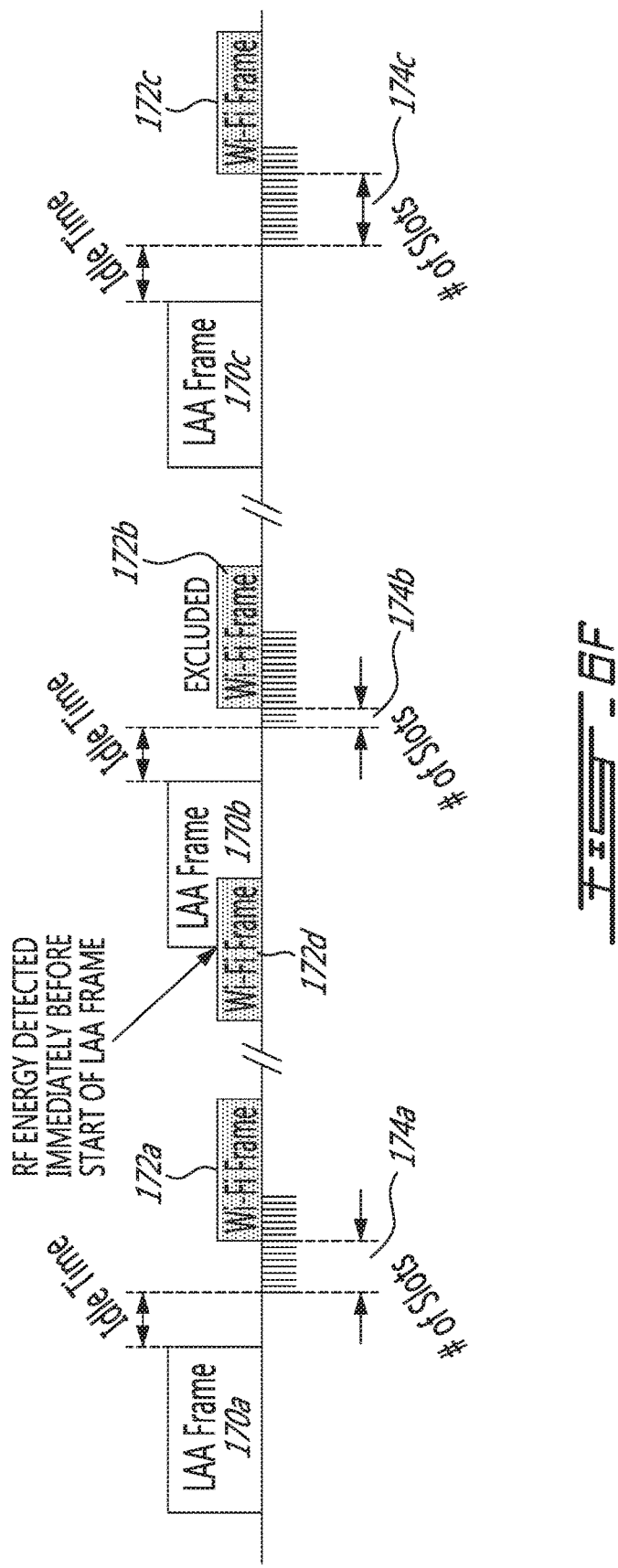

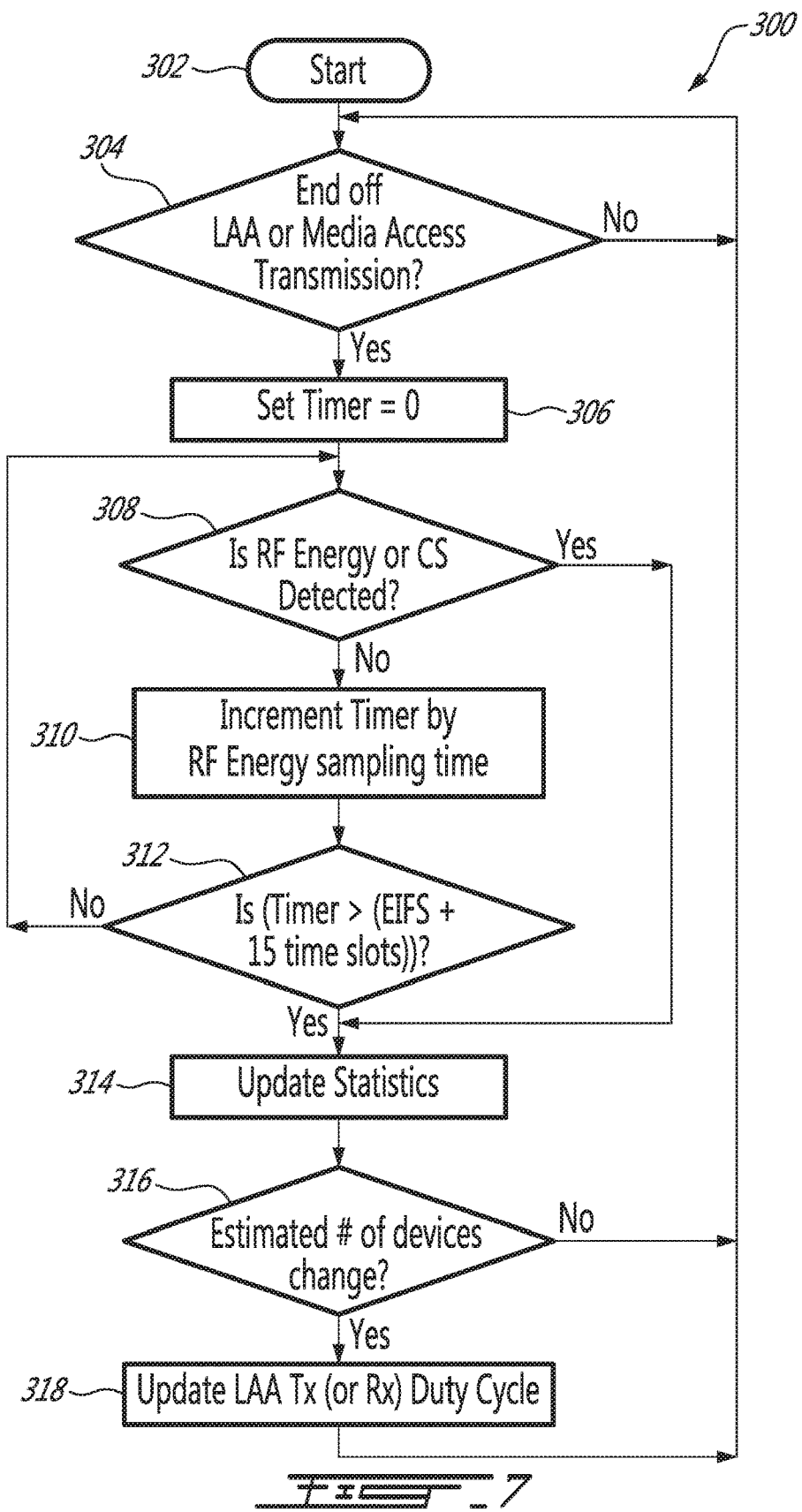

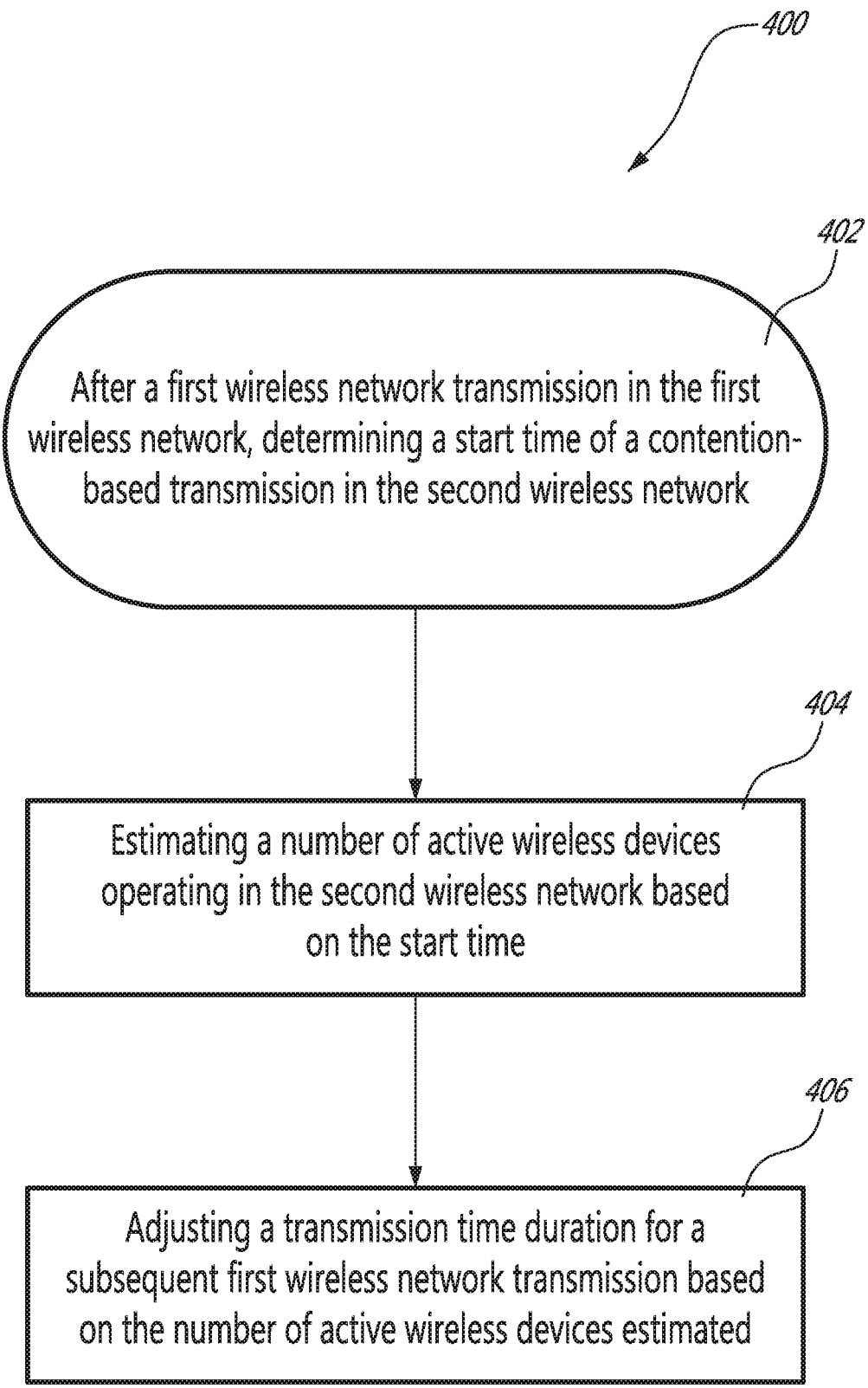

METHOD AND SYSTEM FOR SHARING RADIOFREQUENCY SPECTRUM FOLLOWING A CONTENTION BASED PROTOCOL WITH DETERMINATION OF TRANSMISSION TIME DURATION

RELATED APPLICATIONS

This application is a 35 U.S.C. § 371 national phase filing of International Application No. PCT/IB2015/055003, filed Jul. 2, 2015, which claims the benefit of U.S. provisional patent application Ser. No. 62/165,427, filed May 22, 2015, the content of which are hereby incorporated by reference in their entireties.

TECHNICAL FIELD

The present disclosure relates to a method and system for sharing spectrum resources and in particular for the sharing of spectrum resources by multiple wireless communication networks.

BACKGROUND

3GPP and some to come 5G licensed networks will shortly begin trials to offer services in unlicensed bands. License Assisted Access for Long Term Evolution (LAA-LTE or LAA), as the first example, has recently been demonstrated at Mobile World Congress in March of 2015 using the 5 GHz band. Field trials will start later this year with product rollouts planned for 2016 and 2017.

Unlicensed band advocates have expressed concerns that Wi-Fi, currently the dominant technology deployed in the 5 GHz band, may be adversely affected by LAA-LTE. Concerns over channel sharing have been raised—where Wi-Fi advocates have stated that LAA-LTE, which does not employ channel sharing or listen before talk etiquette functions as Wi-Fi does, may take over the channel and starve Wi-Fi users of the unlicensed band radio channel resource.

To this end, LAA-LTE advocates have simulated, and executed proof of concept demonstrations showing that Wi-Fi and LAA-LTE do co-exist on the unlicensed band channel, and that Wi-Fi typically operates to consume the unused channel time not used by LAA-LTE transmissions.

LAA-LTE advocates have proposed that operators manage the LAA-LTE channel utilization by setting the maximum transmitter duty cycle, so that in environments where there are few Wi-Fi users, LAA-LTE will have more capacity, and in environments where there are many Wi-Fi users, LAA-LTE users will have less bandwidth.

Wi-Fi advocates have responded that such channel sharing arrangements leave all decision making to operators, who may act without full regard to the needs of Wi-Fi users. The LAA-LTE users have responded with many different possible solutions which have the potential for truly fair sharing including, but not limited to, using Wi-Fi receivers in the LAA-LTE radio to monitor Wi-Fi activity, thereby providing insight as to the level of Wi-Fi activity. Moreover, it is expected that the Wi-Fi receivers would perform the dual function of radar signal detection to meet Dynamic Frequency Selection (DFS) requirements—a regulatory function necessary to operate in parts of the 5 GHz unlicensed band. The same Wi-Fi receivers could operate in "promiscuous mode"—a well-known mode of Wi-Fi transceiver operation which is used by packet sniffers applications such as "Omnipeak" to view Over-The-Air (OTA) Wi-Fi data packet traffic for testing and debug purposes. Promiscuous mode is also used by Wi-Fi security applications such as "Air Defense" to monitor OTA traffic in search of Wi-Fi transceivers attempting hostile actions such as Denial of Service attacks, or hackers attempting to gain access to a private Wireless Local Area Network (WLAN).

In the context of LAA-LTE, Wi-Fi transceivers operating in promiscuous mode may be used to monitor Wi-Fi OTA traffic, and to determine the number of idle and active Wi-Fi devices, so that information may be fed back to the LAA-LTE radio algorithms to adaptively change LAA-LTE sharing controls.

For example, if an LAA-LTE radio used an embedded Wi-Fi transceiver, and detected 10 different Wi-Fi beacons from 5 different physical Wi-Fi Access Points (APs) (note that APs may transmit multiple beacons—typically up to 8, but occasionally up to 16), as well as probes packets from 25 different STAtion (STA) clients such as laptops and smart phones, but only two of the devices were actively transferring data, the Wi-Fi transceiver could provide feedback to the LAA-LTE radio indicating the "average" channel loading (from all of the transmitted beacons, and random probe packets and probe responses), as well as the analysis that there were two Wi-Fi devices transferring significant amounts of data. The LAA-LTE radio could then use this information to set an appropriate sharing threshold, accounting for the background "average" OTA utilization (which may be 10% of the airtime), plus the fact that there were two active Wi-Fi devices, so that the LAA-LTE receiver would allocate for itself 30% of the available airtime, calculated as (100% -10% average loading)/(3 devices). This would ensure that the LAA-LTE radio would fairly share the air with the other two Wi-Fi devices, while not overly excessively penalizing itself by assuming that all 10 visible Wi-Fi beacons were "actively" sharing the channel.

This proposal, as explained above, is easily understood, but fails in several aspects explained below.

Incorporating a Wi-Fi receiver into an LAA-LTE receiver does not provide a TTM (time-to-market) solution. Wireless network customers are excited for LAA-LTE as a means to massively increase LTE connectivity leveraging unlicensed spectrum. LTE networks currently form the largest wireless networks globally, and are well-supported by industry. They are therefore currently the fastest means to address international demands of a global economy untethering itself at an unprecedented pace, while doubling data traffic every two years. While Wi-Fi has addressed this requirement for some indoor spaces, specifically residential and enterprise, the same is not true for outdoor national networks.

Any LAA-LTE solution should be as simple as adding another band—a process which designers of LTE networks have completed many times in the past to address different frequency requirements globally. Therefore, moving to 5 GHz should be as simple as re-designing for a new LTE frequency variant, which typically can be accomplished in a period of 12-18 months. Incorporating a Wi-Fi chipset in current LAA-LTE receivers would likely not be possible within that time period and would likely result in a much longer development cycle.

In addition, an LAA-LTE solution which must include a new protocol stack (to accommodate the additional Wi-Fi chipset) would have a great impact on the entire network affecting all layers of hardware and software up to the network layer. The LTE PHY layer is commonly split by all equipment manufacturers into remote (antenna+RF) and centralized (common equipment/control). The 3GPP interface between these two layers is CPRI—Common Public Radio Interface. The addition of a Wi-Fi receiver would affect remote and common equipment, impact CPRI, and affects all network level Software functions. Achieving industry consensus for such a proposed solution would take many years to achieve, and to rollout.

The proposed solution does not address Federal Communications Commission (FCC) and global regulator mandates addressing how they manage the spectrum. The role of regulators such as the FCC is not to define radio solution implementations, but rather, how devices must perform to ensure that the spectrum resources are well managed.

The 5 GHz unlicensed band called the Unlicensed National Information Interchange (U-NII) is managed by the FCC as being a digitally modulated band, with specified Conducted Power and Effective Isotropic Radiated Power (EIRP) levels, Power Spectral Density (PSD) levels, bandwidths, and out-of-band emissions. Requirements for the detection of "radar" in terms of their power signatures, durations, periodicities, and "chirp" characteristics are defined by the regulators, and required radio actions defined, such as channel scanning times, and times when devices must keep off the channel.

Regulators define monitoring requirements in terms of low level radio parameters, and they do not define how the receiver should work, or protocol related requirements of receivers.

Regulators take the position that their role is to manage the spectrum, while not defining the solution, as this enables industry and competition to arrive at the best solution, without unnecessary requirements.

Although the U-NII band is predominantly used by Wi-Fi devices, regulations do not mandate Wi-Fi devices. Regulators have conducted many studies on Wi-Fi, but they will not force the industry to make Wi-Fi the only solution, as this would restrict industry and technology advancement.

This is not to say that the industry has been pushing regulators to make the U-NII bands Wi-Fi bands, but that in itself is not likely to happen as wireless untethering, with the Internet of Things (IoT), an infrastructure to wirelessly connect things such as toasters, watches, and car keys in very early days but looming on the horizon, coupled with the anticipated massive rollout of the 3GPP and 5G evolutionary products from cellular equipment manufacturers and service providers. In other words, the unlicensed bands are likely to remain unlicensed—free for all to use, without regulated protocols, but with limited PHY level rules to ensure that devices can operate without adversely affecting or being affected by other wireless devices operating in the same band.

The incorporation of a Wi-Fi receiver solution is therefore arguably for the short-term and does not address the next generation of IoT & 3GPP devices. It focuses on co-existence with the Wi-Fi protocol stack, a current problem but only one of potentially many other co-existence problems to arise in the future in the U-NII or other shared bands.

The industry proposed solution has been stated to "work for Wi-Fi" but in reality does not work for MIMO (multiple-input multiple output) and MU-MIMO (multi-user MIMO), commonly used in 802.11n and 802.11ac Wi-Fi chipsets. MIMO is the default operation of laptops and phablets operate with 2×2, 3×3 and soon 4×4 MIMO and MU-MIMO. All of the new 5 GHz smart phones are switching to 2×2 MIMO to double 5 GHz throughput, while improving spectrum efficiency. The solution assumes that these MIMO devices can be demodulated by the Wi-Fi receiver on the LAA-LTE radio, but in actual fact, in many cases they cannot. First, in order to demodulate an N×N signal, the Wi-Fi receiver in the LAA-LTE radio must have N antennas.

It is highly unlikely that LAA-LTE systems will use greater than 2 antennas for most applications, while indoor enterprise Wi-Fi systems have all switched to 4×4 MIMO support. Additionally, Wi-Fi radios employ MIMO and MU-MIMO to increase OTA efficiency and throughput, and they achieve these higher rates by optimizing SNR on a client by client basis, using RAA (Rate Adaptation Algorithms) designed to operate at the highest possible bit rate for maximum efficiency. It is difficult, if not impossible for an LAA-LTE radio with N-antennas to demodulate all (N×N) OTA packets, since it is highly unlikely that the LAA-LTE radio will receive sufficient SINR for the packet to be demodulated. Therefore, these packets, even though they may have good RSSI, will appear as noise, making their statistics invisible in a solution depending on counting them.

The industry proposed solution may also have longer term ethical and legality issues, as OTA packets are demodulated and information collected about "BSSIDs" and MAC addresses.

Finally, the industry proposed solution may not work for non-standard Wi-Fi channels, or for Wi-Fi signals which are on adjacent channels. For example, LAA-LTE is expected to use channel 32 (5160 MHz) which is not a standard Wi-Fi channel, yet will see interference from channel 34 (5170 MHz) which is a Wi-Fi channel. The proposed solution would actually require multiple receivers spaced at 5 MHz offsets to be able to look for Wi-Fi interference across the various 5 MHz channel offsets.

Accordingly, to address some or all of the drawbacks noted above, it would be desirable to avoid the use of a Wi-Fi receiver in LAA-LTE radios for co-existence over an unlicensed band.

SUMMARY

The present disclosure is directed to a method and system for the sharing spectrum or frequency resources amongst wireless networks in certain bands e.g. bands normally used for unlicensed access.

In one aspect of the present disclosure, there is provided a method for a network node configured to control transmissions in a first wireless network, the first wireless network transmissions occurring in a frequency band used for contention-based transmissions in a second wireless network. The method includes after a first wireless network transmission in the first wireless network, determining a start time of a contention-based transmission in the second wireless network, estimating a number of active wireless devices operating in the second wireless network based on the start time, and adjusting a transmission time duration for a subsequent first wireless network transmission based on the number of active wireless devices estimated.

In some embodiments, the first wireless network includes a Radio Access Network (RAN) and the second wireless network comprises a Wireless Local Area Network (WLAN). In other embodiments, the active wireless devices operate in accordance with a contention-based protocol. In yet other embodiments, the method includes after each of a plurality of first network transmissions, determining a start time for a respective subsequent contention-based transmission in the second wireless network. In yet other embodiments, the start time determination is only performed when the respective subsequent contention-based transmission is not a control transmission or a re-transmission.

In yet other embodiments, estimating a number of active wireless devices includes estimating the number of active wireless devices based on a probability function for the start time, the start time corresponds to a particular slot time in a contention window, the probability function is indicative of the probability that a contention-based transmission starts during the particular slot time, the probability function is indicative of the number of active wireless devices operating in the second wireless network, and/or the number of active wireless devices estimated is one when the probability function for the start time is evenly distributed across all slot times of the contention window.

In yet other embodiments, the method further includes detecting energy associated with the contention-based transmission in the frequency band where the determining includes determining the start time for the contention-based transmission based on the energy detected.

In yet other embodiments, the first wireless network transmission and contention-based transmission occur in overlapping channels of the frequency band. In yet other embodiments, the adjusting includes increasing the transmission time duration for the subsequent first wireless network transmission when the number of active wireless devices estimated is below a target and decreasing the transmission time duration for the subsequent first wireless network transmission when the number of active wireless devices estimated is above the target.

In yet other embodiments, the number of active wireless devices estimated is zero and the method further includes detecting energy associated with one or more control transmissions in the second wireless network, and adjusting the transmission time duration for the subsequent first wireless network transmission based on the one or more control transmissions detected.

In another broad aspect of the present disclosure, there is provided a network node in a first wireless network configured to perform any of the method embodiments described above. In some embodiments, the network node includes an access node (e.g. an eNodeB) or a wireless device.

In yet another broad aspect of the present disclosure, there is provided a computer program product configured to implement any of the above method embodiments described above.

In yet another broad aspect of the present disclosure, there is provided a network node configured to control transmissions in a first wireless network where the first wireless network transmissions occur in a frequency band used for contention-based transmissions in a second wireless network. The network node includes a determination module for determining, after a first wireless network transmission in the first wireless network, a start time of a contention-based transmission in the second wireless network. The network node also includes an estimation module for estimate a number of active wireless devices operating in the second wireless network based on the start time; and an adjustment module for adjusting a transmission time duration for a subsequent first wireless network transmission based on the number of active wireless devices estimated.

Advantageously, in examples where the second wireless network is a WLAN (e.g. Wi-Fi) network, the present disclosure does not require a separate or additional WLAN receiver to estimate the system load and/or the number of devices operating in the WLAN network.

As yet another advantage in certain examples, the present disclosure instead uses controllable parameters such as (Radio Frequency) RF energy, transmission duty cycle, and/or time periods. These types of parameters can be regulated more easily than receiver-based solutions.

As yet another advantage of certain examples, no demodulation of the data stream(s) is required to estimate the WLAN system load and/or the number of devices operating in the WLAN network. This advantage is particularly useful for MIMO and MU-MIMO environments. Also, because it is not necessary to demodulate user data, the data itself and device identifiers associated with the data transmissions (for example MAC addresses, BSSIDs, etc.) are not unnecessarily exposed.

As yet another advantage of certain examples, band specific features such as radar detection (DFS) and Listen-Before-Talk (LBT) may be implemented in an LAA-LTE receiver without the need for a separate WLAN (Wi-Fi) receiver.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings in which like reference designators refer to like elements and wherein:

FIG. 6A-6F are timing diagrams showing examples of WLAN transmissions which can be considered or excluded from consideration to estimate a number of wireless devices operating in the WLAN networks of FIG. 1 in accordance with the principles described herein;

FIG. 7 illustrates a flow chart example of a method for an access node in the LTE network of FIG. 1 configured to control LTE transmissions in accordance with the principles described herein;

FIG. 8 shows another example of a method for an access node configured to control transmissions in a first wireless network in accordance with the principles described herein;

DETAILED DESCRIPTION

The present disclosure is directed to a method and system for sharing spectrum or frequency resources amongst wireless networks in certain bands e.g. unlicensed bands or bands normally used for unlicensed access. The description that follows describes how wireless devices in a first wireless network (e.g. a License Assisted Access (LAA)—Long Term Evolution (LTE) Radio Access Network (RAN)) can operate in a frequency band which is also used for contention-based transmissions by wireless devices in one or more second wireless network(s) such as for example, a Wireless (e.g. Wi-Fi) Local Area Network (WLAN). However, those having ordinary skill in the relevant art will readily appreciate that the principles described herein may equally apply to other types of networks.

For example, the first wireless network may also include other $3^{rd}$ Generation Partnership Project (3GPP) networks (e.g. Universal Mobile Telecommunications System UMTS, LTE-Advanced (LTE-A)), LTE-Unlicensed (LTE-U), $4^{th}$ Generation (4G), $5^{th}$ Generation (5G) or other future generations of a 3GPP communication network infrastructure. The first wireless network may also be a network that uses a Media Access Control (MAC) method and/or transmissions based on contention such as a WLAN (e.g. Wi-Fi) network, a Wireless Personal Area Networks (WPAN), a Wireless Metropolitan Area Networks (WMAN), etc. More generally, the first wireless network may include any current or future wireless network infrastructure adapted to or configured to control its transmissions (e.g. with scheduled or contention-based transmissions) so as to provide a second wireless network(s) and devices using contention-based transmissions with access to the shared spectrum.

Similarly, the second wireless network(s) described herein primarily as WLANs (e.g. Wi-Fi) may also include other examples of short range wireless networks such as WPANs, WMAN, as well as other types of wireless networks such as CT2Plus and Digital Enhanced Cordless Telecommunications (DECT), etc. More generally, the second wireless network(s) may include any access network in which its associated wireless devices use some form of media access method and/or transmissions based on contention. For clarity and as used herein, the term WLAN is used to cover all of these possibilities for the second wireless network(s).

Figure 1:
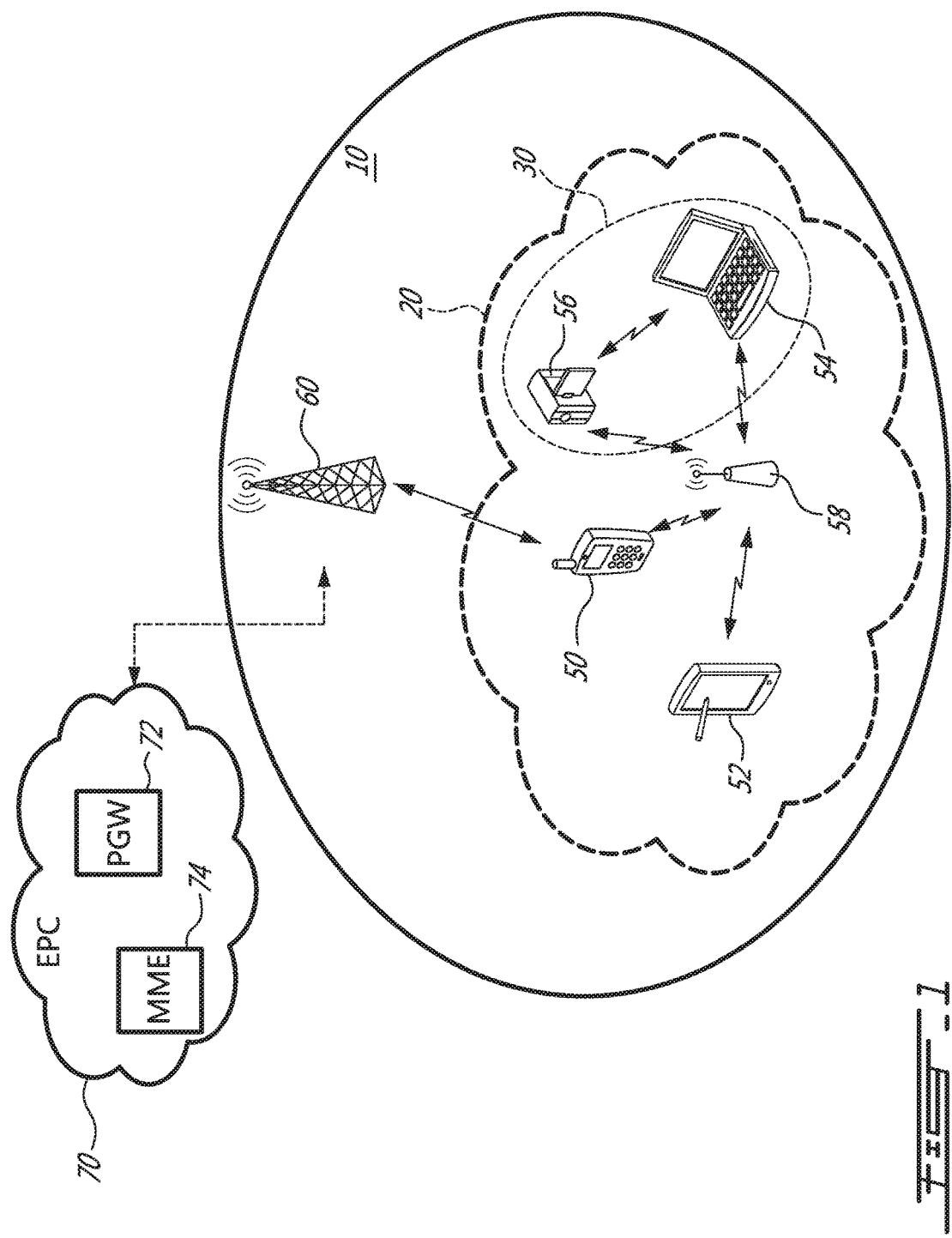
FIG. 1 illustrates one example of a Long Term Evolution (LTE) Radio Access Network (RAN) and Wireless Local Area Networks (WLANs) configured to share a band of spectrum resources, in accordance with the principles described herein.

Referring now to FIG. 1, there is shown one example of an LAA-LTE RAN 10 and WLANs 20, 30 in which an access node 60 is configured to control transmissions in the LAA-LTE RAN 10 so as to share spectrum resources with devices 50, 52, 54, 56, 58 operating in the WLANs 20, 30. Generally, the WLANs 20, 30 (an example of the second wireless network(s)) may each include any number of wireless devices (also referred to as WLAN devices) communicating directly with one another or via Access Points (APs) to other devices in the same or different networks. In the example of FIG. 1, WLAN 20 is shown to include WLAN devices 50, 52, 54 and AP 58 while WLAN 30 includes WLAN devices 54 and 56. Other network configurations for WLANs 20, 30 are possible (e.g. only one WLAN 20 co-existing with the LTE RAN 10).

As is conventional, WLAN devices 50, 52, 54 and AP 58 in WLAN 20 and WLAN devices 54, 56 in WLAN 30 (herein generically referred to as WLAN devices) are configured to share a band of spectrum using some form of media access method and/or transmissions based on contention. As is well-known, there are many examples of such contention-based approaches. Examples include Listen-Before-Talk (LBT), Carrier Sense Multiple Access (CSMA)— with Collision Detection (CSMA-CD), CSMA with Collision Avoidance (CSMA—CA), etc. Using a contention-based method, a WLAN device 50, 52, 54, 56, 58 will try to determine whether another transmission is progress in the channel or band used. This determination could be based on for example the detection of a carrier wave, signal or energy in the channel or band of interest. If a carrier or energy is detected in the band or channel of interest (in another fully or partially overlapping channel or band), the WLAN device 50, 52, 54, waits for the transmission in progress to finish before initiating its own transmission.

In the LAA-LTE RAN 10 of FIG. 1, wireless device 50 is configured to communicate with an access node 60 using the same band of spectrum used in WLANs 20, 30. The access node 60 is an eNodeB but in other implementations, the access node 60 may be, depending on the type of wireless network, an Node B (NB), evolved Node B (eNB), base station, base station controller (BSC), radio network controller (RNC), relay, donor node controlling relay, base transceiver station (BTS), transmission point, transmission node, remote RF unit (RRU), remote radio head (RRH), a node in a distributed antenna system (DAS), or a memory management unit (MMU). Generally, the access node 60 is configured to control transmissions to or from UEs in the LTE RAN 10 but other nodes in the LTE RAN 10, a Core Network (CN) 70 or in a network outside of a RAN/CN infrastructure (e.g. an Internet Protocol (IP) node in an IP network) may be configured for that purpose. In other implementations, a wireless device or UE (for example, a relay node UE) may be configured to control transmissions to or from other wireless devices in a wireless network. It is to be understood that the functionality described herein in relation to nodes that control transmissions in a wireless network (e.g. an access node) may also equally apply to wireless devices configured as such.

The wireless device 50 communicates via the LTE RAN 60 with one or more core networks 70 such as, by way of non-limiting example, an Evolved Packet Core (EPC) network which includes a Mobility Management Entity 74 and a Packet Data Network (PDN) Gateway (PGW) 72. The UE or wireless device 50 may be any type of device capable of at least communicating through wireless communication in the LTE RAN 10. Further, the wireless device 50 and access node 60 are configured to use and/or operate with either a single carrier although the concepts described herein may be applied, with or without modification that will be apparent to a person having ordinary skill in the relevant art, to multi-carrier or carrier aggregation-based communications.

The wireless device 50 may be, for example a wireless terminal (also known as a mobile station, a mobile phone ("cellular" phone), a desktop, laptop, netbook, and/or tablet computer, a laptop embedded equipment (LEE), laptop mounted equipment (LME), or a portable device such as an e-book reader, watch, digital music and/or video player, camera, game controller and/or device but also may be a computing-like device such as a hart monitoring implant, biochip transponder, automobile, sensor, modem, thermostat, and/or other home or car appliance generally referred to as an Internet of Things (IoT) device, a machine type communication (MTC) device (also known as a machine-to-machine (M2M) or device-to-device (D2D) device.

Figure 2:
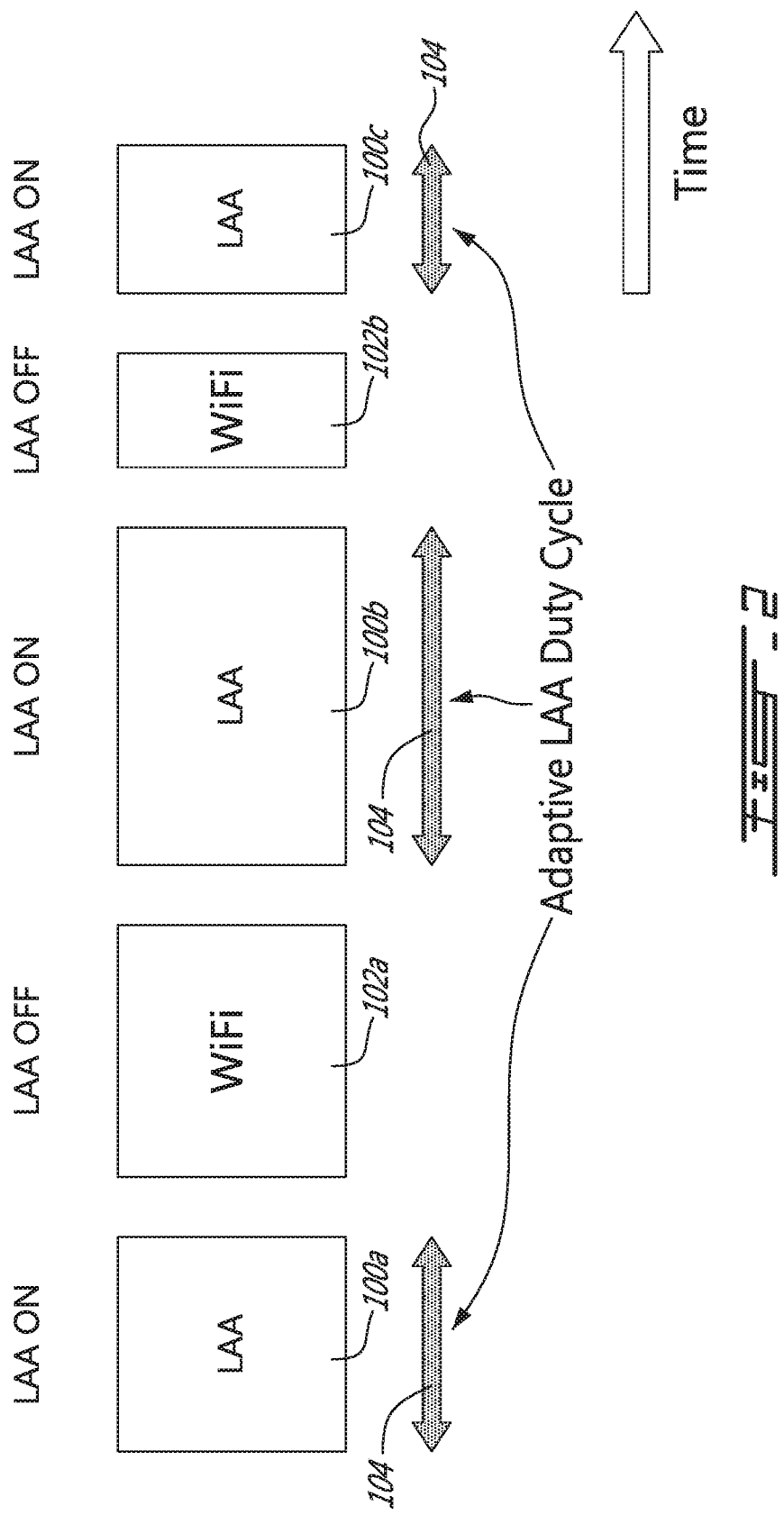
FIG. 2 illustrates an example of the LTE RAN of FIG. 1 using an adaptive transmission duty cycle, in accordance with the principles described herein.

Turning now to FIG. 2, there is shown an example of how the LAA LTE RAN 10 shares and therefore co-exists with the WLANs 20, 30 in the same or an overlapping band of spectrum. According to principles of the present disclosure, the access node 60 in the LTE RAN 10 is configured to multiplex its transmissions in time (either DL or UL) with those in WLANs 20, 30 using an adaptive (ie adjustable) transmission time duration or duty cycle that is controlled based on a number of active WLAN devices estimated to be active in the WLANs 20, 30. in the example of FIG. 2, The access node 60 of the LTE RAN 10 uses a contention-based access method (e.g. Carrier Sense Adaptive Transmission (CSAT)) that defines an adaptive duty cycle 104 for LTE Downlink or Uplink transmissions (i.e. the ON duration) and gates off LTE transmissions in the remaining duration (i.e. the OFF duration). FIG. 2 shows three LTE ON durations 100a, 100b, 100c during which the access node 60 can schedule LTE transmissions and two OFF durations 102a, 102b during which the channel or band is not occupied by LTE transmissions and hence available for WLAN transmissions. The combination of the ON and OFF durations defines an LAA-LTE period.

According to principles of the present disclosure, after an LAA-LTE transmission, the LAA-LTE duty cycle (e.g. the ON duration) is adjusted for subsequent LAA-LTE transmissions based on a number of active WLAN devices estimated to be active or actively transmitting/receiving data in the WLANs 20, 30. As will be explained below in greater detail, the access node 60 estimates the number of active WLAN devices based at least in part on WLAN transmission start times observed in the shared spectrum.

It is understood that in other implementations, the LAA-LTE OFF duration or the LAA-LTE period could be adjusted instead of the ON duration as generally, any change in these parameters result in a corresponding adjustment of the LAA-LTE ON duration. For clarity, the embodiments described herein from the perspective of adjusting the LAA-LTE ON duration (e.g. duty cycle or transmission time duration) are equally applicable to implementations where the LAA-LTE OFF duration and/or period are adjusted instead (with modifications that would be obvious to a person skilled in the art).

As is well-known, Wi-Fi devices share the spectrum by taking turns as to who goes first after a previous Wi-Fi transmission completes. They do this with using a randomizing algorithm designed to support many Wi-Fi devices all trying to get a fair share of the channel. To enable fair sharing, Wi-Fi uses a Contention Window (CW) as a period of time [0, CW] during which Wi-Fi devices randomly and uniformly defer the start of their transmission while the shared media is idle. The Wi-Fi CW operation is detailed in IEEE Wireless LAN Medium Access Control (MAC) and Physical Layer (PHY) Specifications, version IEEE 802.11-2012, dated 29 Mar. 2012, hereinafter referred to as the "802.11 MAC/PHY Specification" and incorporated by reference herein in its entirety.

Figure 3:
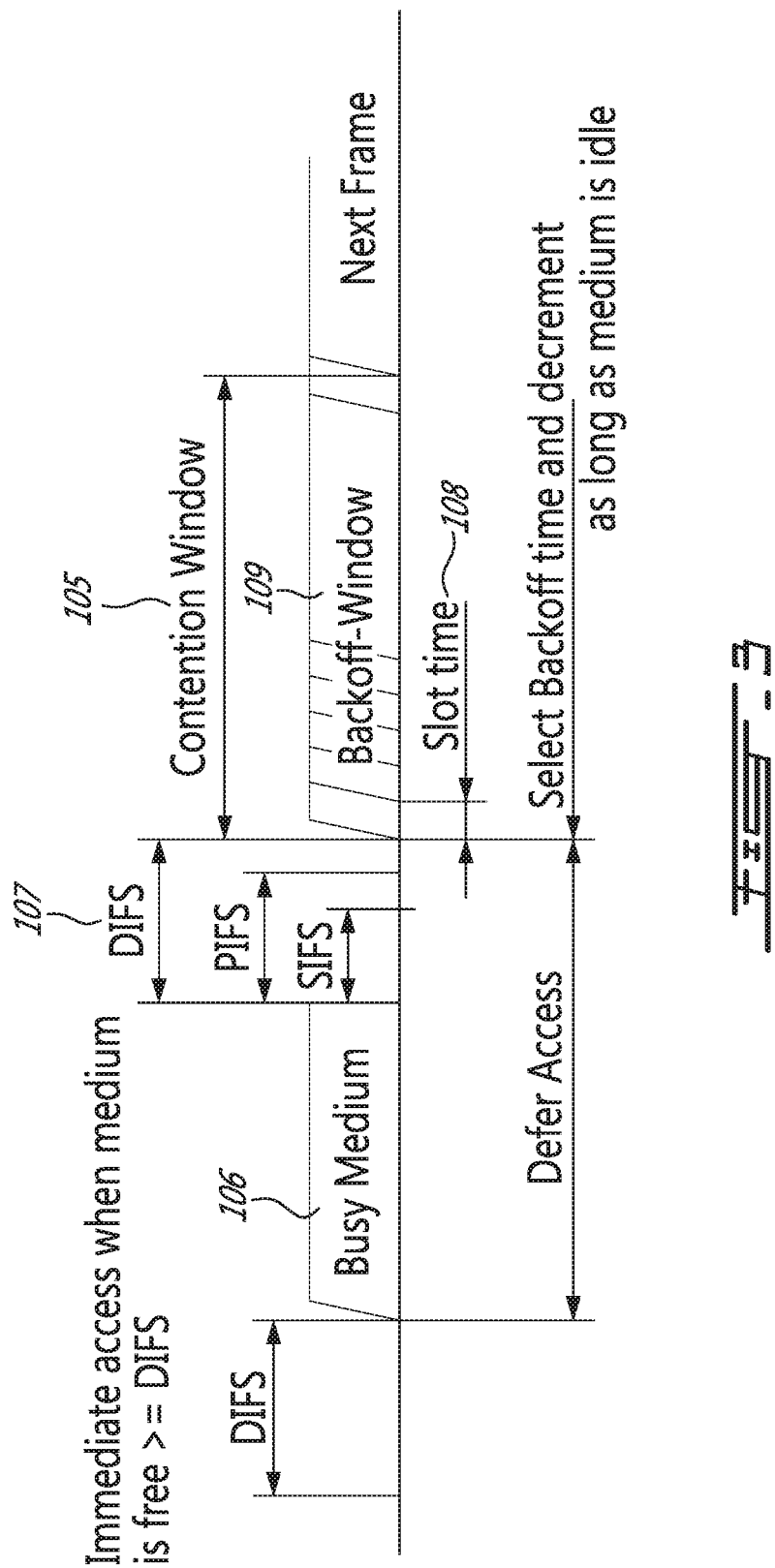
FIG. 3 illustrates a timing diagram for a Contention Window, in accordance with the principles described herein.

FIG. 3 shows an example of a Contention Window 105 as defined in the 802.11 MAC/PHY Specification. After a transmission in the shared medium (e.g. an LAA-LTE or Wi-Fi transmission) shown as "Busy Medium" 106, the channel or spectrum is specified to be free for a period of time called Distributed Coordination Function Inter-Frame Space (DIFS or "DCF Inter-Frame Space").

This period shown as 107 in FIG. 3, and generally referred herein as the "idle" period or time, is specified to be 34 μs for any 5 GHz Wi-Fi operation including 802.11a, 802.11n, and 802.11ac. However, other possibilities exist for the idle time. It could, for example, represent other forms of Inter Frame Space (e.g. Point Coordination Function IFS or PIFS, Short IFS or SIFS, Extended IFS or EIFS or combinations thereof) as is well known in the art.

The Contention Window 105 occurring after the idle period (DIFS) 107, is composed of an integer number of Slot Times or bins 108 which are each defined to be of an equal 9 μs duration. According to the 802.11 MAC/PHY Specification, a Wi-Fi device with data to transmit must wait until after the idle period 107 elapses after a last frame was detected on the medium (e.g. busy Medium 106) and an additional deferral time equal to a random backoff time period 109 selected within the Contention Window 105. If the Wi-Fi device determines the channel/medium to be idle without interruption during that time 109, the Wi-Fi device can select a start time or slot time (bin) for its transmission that corresponds to the expiry of the random backoff time period 109. The CW size ranges from a minimum value of $CW_{min}$ to a maximum value of $CW_{max}$ or from roughly 8*9=72 μs to as high as 9207 μs (for an AP where CWmax reaches 1023). Section 9.3.3 of the 802.11 MAC/PHY Specification requires that a Wi-Fi device which suffers a collision increases the size of its Contention Window 105. As the number of collisions increases, the Contention Window 105 used by active Wi-Fi devices increases accordingly so that (fair) spectrum sharing can be maintained.

Figure 4:
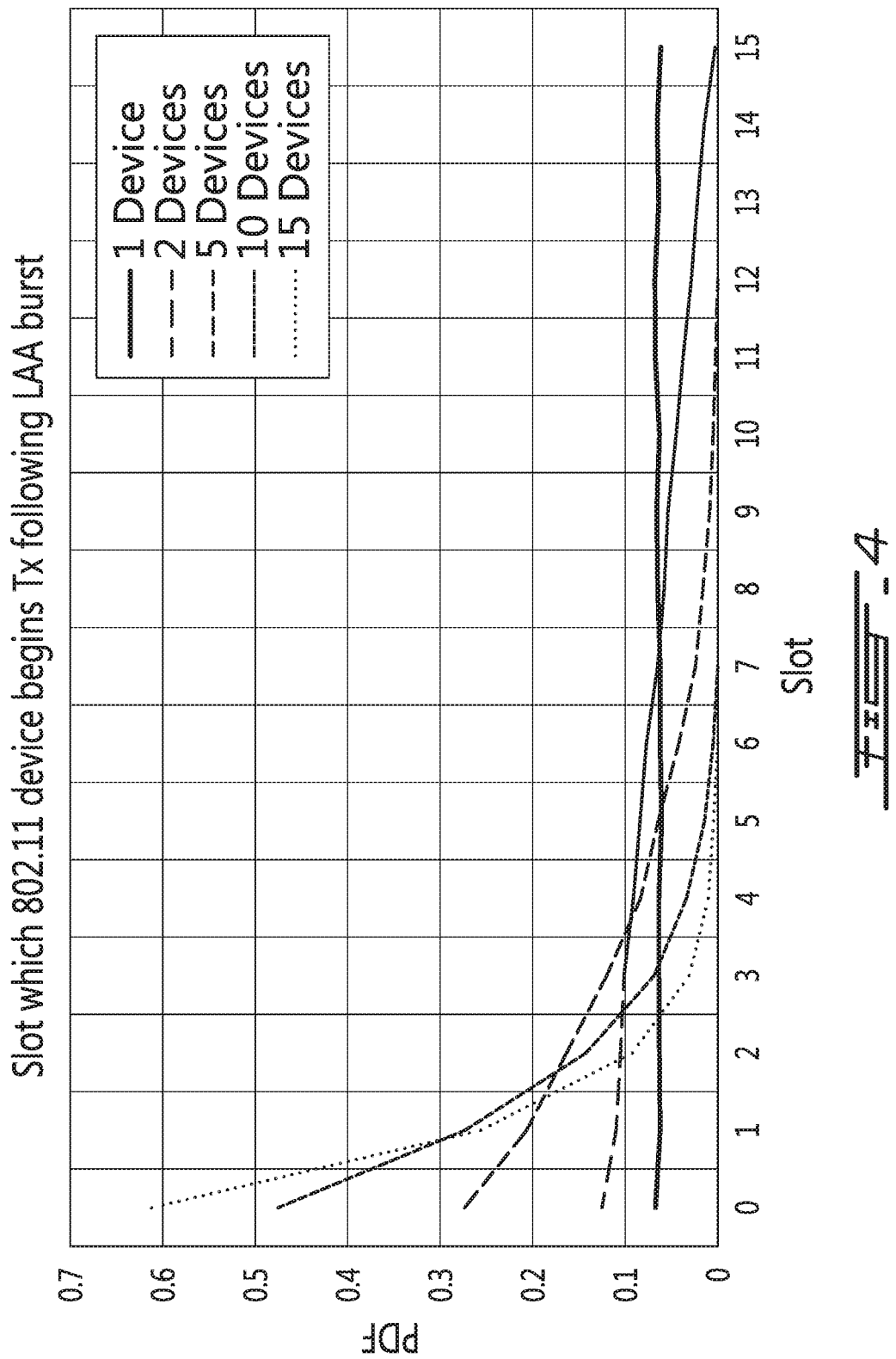
FIG. 4 illustrates an example of a Probability Distribution Function (PDF) for a slot time for WLAN transmissions in the WLAN networks of FIG. 1 in accordance with the principles described herein.

Simulated experiments with active Wi-Fi devices (e.g. devices with full buffers during file transfers, or audio/video streaming) show that that the slot time (bin) or start time selection probabilities associated with Wi-Fi transmissions are correlated to the number of Wi-Fi devices actively transmitting in the channel or medium. FIG. 4 illustrates an example of a Probability Distribution Function (PDF) for a Wi-Fi transmission slot time or start time selection for 1, 2, 5, 10 and 15 active Wi-Fi (e.g. 802.11) devices over a Contention Window of 15 slot times.

As shown, with a single active Wi-Fi device, the PDF slot time behavior of that single Wi-Fi device over the Contention Window is flat—meaning that, over time, it equally selects all slot times for its transmissions. As the number of active Wi-Fi devices increases (i.e. the number of Wi-Fi devices with transmissions increases), the aggregate probabilities of earlier slot times being selected increase, while the probabilities of later slot times being selected decrease. It can also be noted that different numbers of active Wi-Fi devices correspond to different slot time or start time PDFs over the Contention Window.

Figure 5:
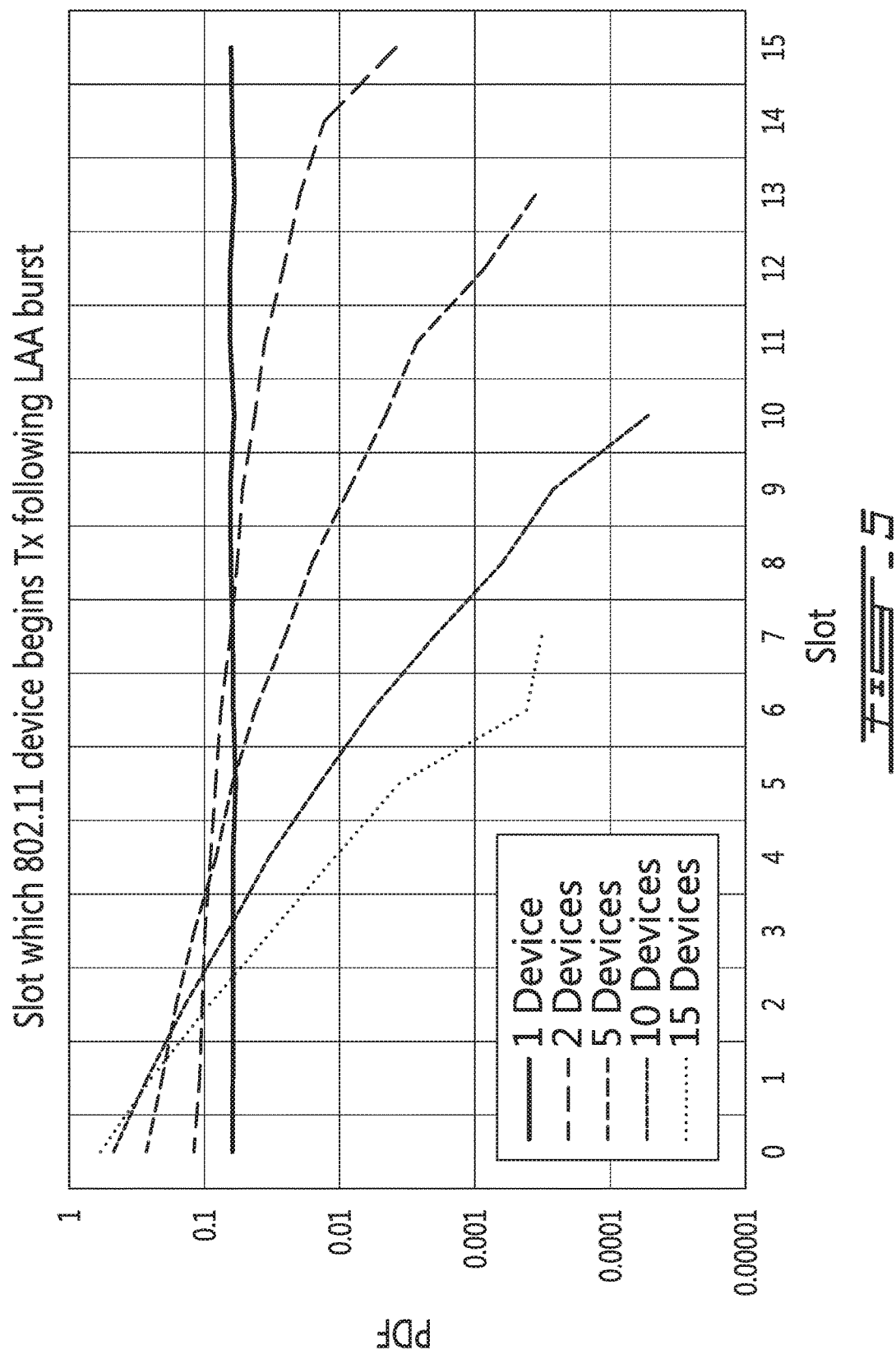
FIG. 5 illustrates an example of a logarithmic PDF for a slot time for WLAN transmissions in the WLAN networks of FIG. 1 in accordance with the principles described herein.

FIG. 5 illustrates an example of a logarithmic PDF for a slot time for Wi-Fi transmissions for 1, 2, 5, 10 and 15 active Wi-Fi devices over a Contention Window of 15 slot times. As it can be seen in this example, different numbers of active Wi-Fi devices correspond to different slot time or start time logarithmic PDFs over the Contention Window. In addition, the slope of each logarithmic PDF corresponds to a different number of active Wi-Fi devices.

In some embodiments, the present disclosure relies on Contention Window statistics, specifically statistics for individual and/or aggregate slot-time/start time selection probabilities (indicative of when WLAN devices grabs the channel) to estimate how many WLAN devices are actively transmitting. Statistics can be collected for one or more contention-based transmissions in a variety of ways including over a period of time (e.g. durations of seconds, minutes or longer), a number of transmissions or a combination of both. Other implementations are possible. Depending on the level of accuracy needed, a reliable estimate of the number of active devices can be obtained relatively quickly. This information is then used by the access node 60 to dynamically configure or adjust the LAA-LTE channel usage (or duty cycle) so that the LAA-LTE RAN 10 can share the spectrum with devices 50, 52, 54, 56 and APs 58 in the WLANs 20, 30 and any other wireless device or network operating in the same or an overlapping/neighboring channel.

In some examples, the access node 60 (of FIG. 1) monitors activity in the medium to determine a start time or slot time for a contention-based (e.g. WLAN) transmission that occurs after an LAA-LTE transmission (either UL or DL). As described previously, the start time/slot time may be expressed as a period of time, a number of slot times or in other manners. In some other examples, the access node 60 performs this determination for each one of multiple LAA-LTE transmissions. However, it is also to be noted that that this information need not be collected just after LAA-LTE transmissions. Generally, statistics for contention-based transmissions can be collected after any transmission in the medium (e.g. after the medium busy period). This could include for example an LAA-LTE transmission (either UL or DL transmission), a WLAN transmission or any other transmission (contention-based or otherwise) from other wireless devices or network operating in the shared medium.

FIGS. 6A-6F are timing diagrams showing examples of contention-based transmissions or frames which can be considered to estimate a number of wireless devices actively operating in the WLANs 20, 30 of FIG. 1 in accordance with the principles described herein.

Figure 6A:
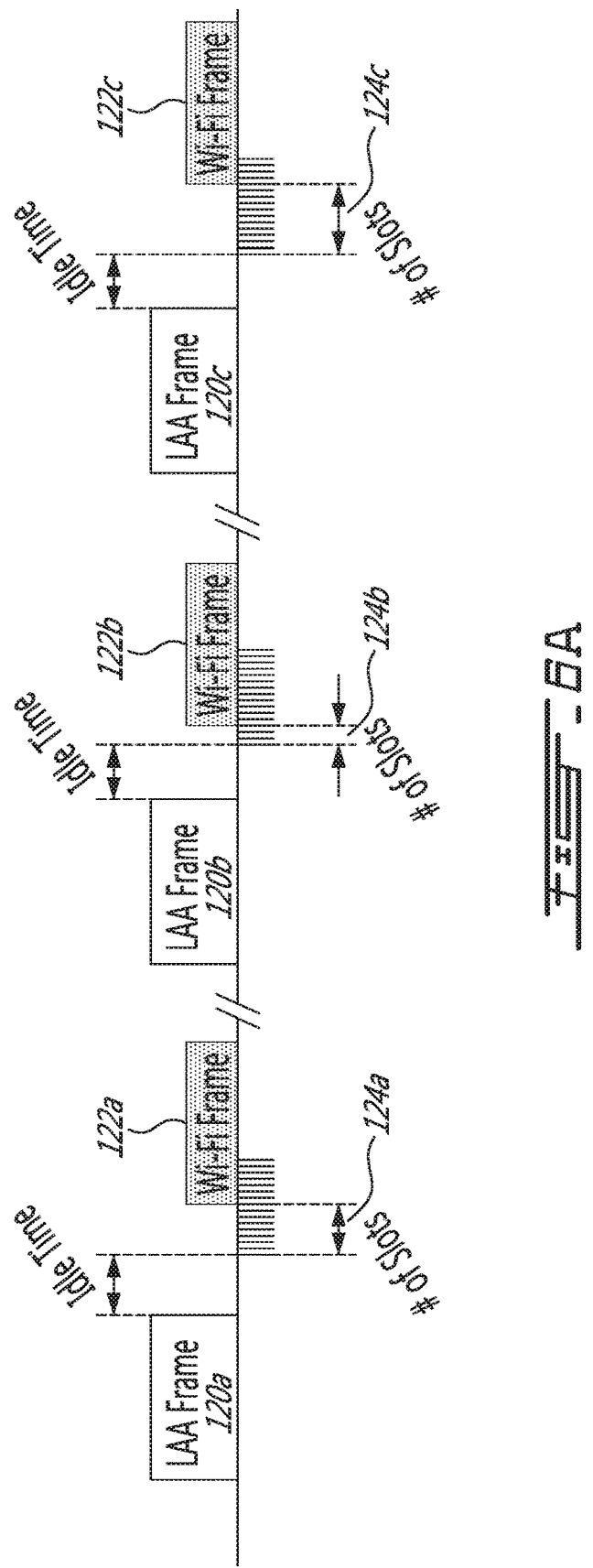

FIG. 6A shows the monitoring of certain WLAN (e.g. Wi-Fi) frames that occur after the transmission of an LAA-LTE frame to estimate the number of active WLAN devices. In this example, each LAA-LTE frame 120a, 120b, 120c is followed by a WLAN frame 122a, 122b, 122c. The access node 60 is configured to monitor energy in the medium to determine a start time 124a, 124b, 124c for each of the WLAN frames 122a, 122b, 122c that occur after an LAA-LTE frame 120a, 120b, 120c. The start time 124a, 124b, 124c is shown to be the amount of time expressed a number of slots after the idle time. Based on the start time determined for one or more of these WLAN frames 122a, 122b, 122c (and their respective selection probability function), a corresponding number of active WLAN devices can be estimated.

Figure 6B:
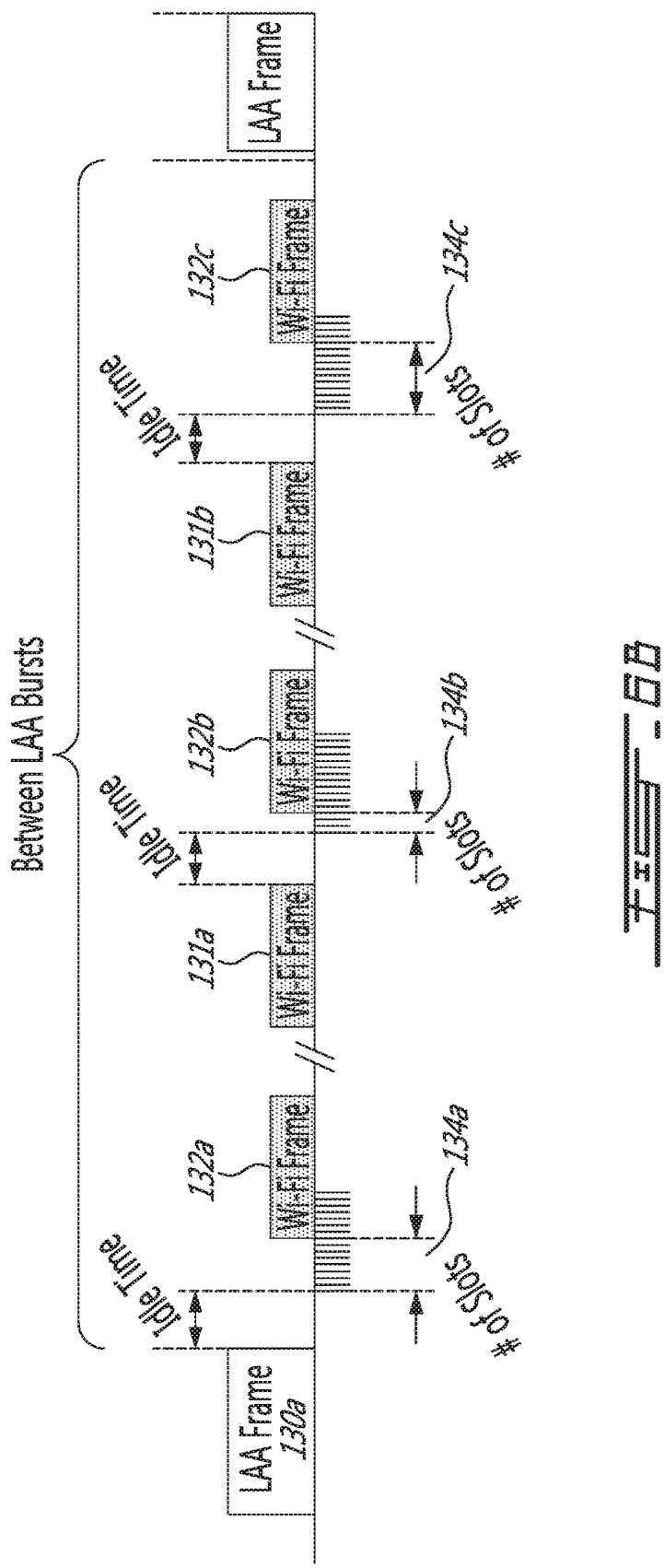

FIG. 6B shows the monitoring of certain WLAN (e.g. Wi-Fi) frames that occur after the transmission of an LTE frame or another WLAN frame to estimate the number of active WLAN devices. Similarly to the example shown in FIG. 6A, a start time 134a for WLAN frame 132a that follows an LAA-LTE frame 130a is determined but in addition, the access node 60 is also configured to determine a start time 134b, 134c for each of the WLAN frames 132b, 132c that occurs after a previously transmitted WLAN frame 131a, 131b. Based on the start time determined for one or more of these WLAN frames 132a, 132b, 132c (and their respective selection probability function), a corresponding number of active WLAN devices can be estimated.

Figure 6C:
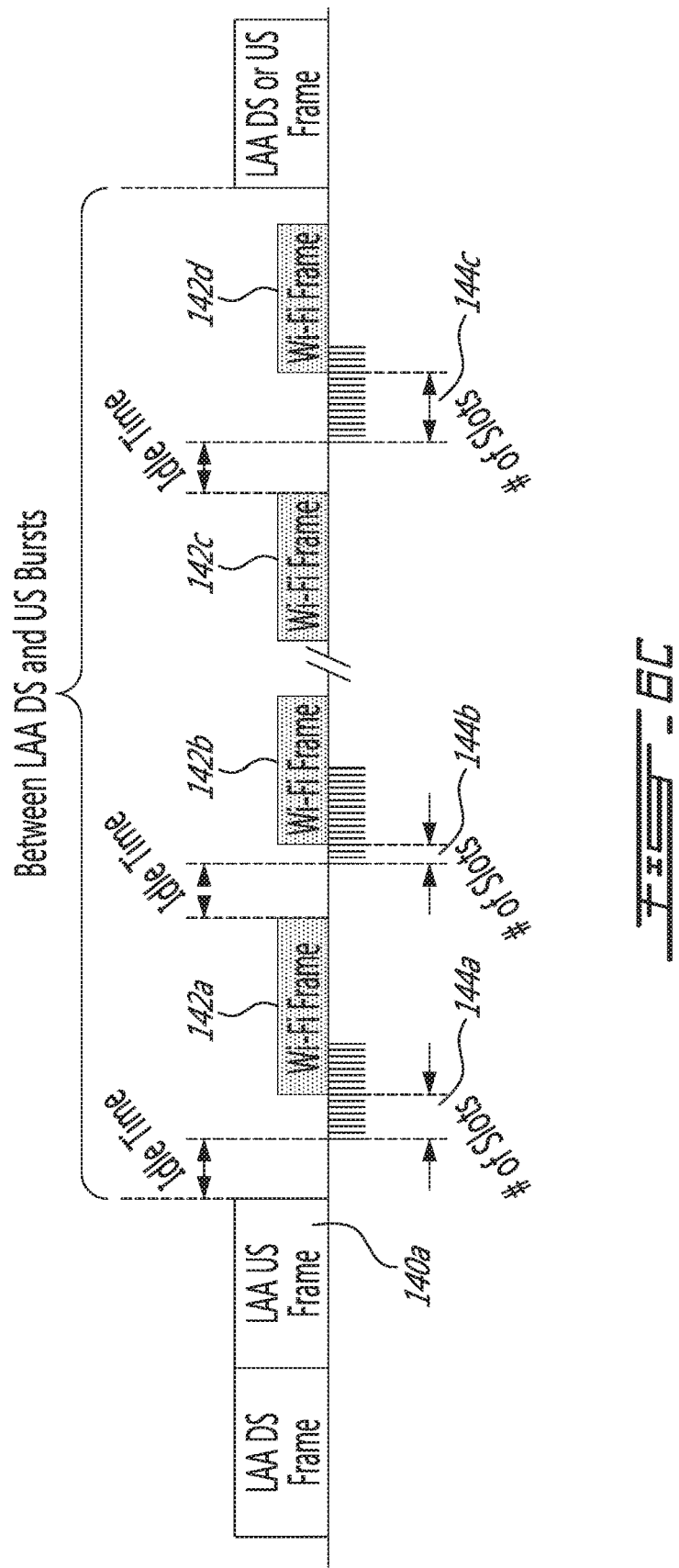

FIG. 6C shows the monitoring of certain WLAN (e.g. Wi-Fi) frames that occur after the transmission of another WLAN frame or an LTE uplink or downlink frame to estimate the number of active WLAN devices. In this example, the access node 60 is configured to determine a start time 144a for a WLAN frame 142a that follows an LAA-LTE uplink frame 140a and in addition, a start time 144b, 144c for each of the WLAN frames 142b, 142d that occurs after a previously transmitted WLAN frame 142a, 142c (in consecutive WLAN frame pairs). Based on the start time determined for one or more of these WLAN frames 142a, 142b, 142d (and their respective selection probability function), a corresponding number of active WLAN devices can be estimated.

Figure 6D:
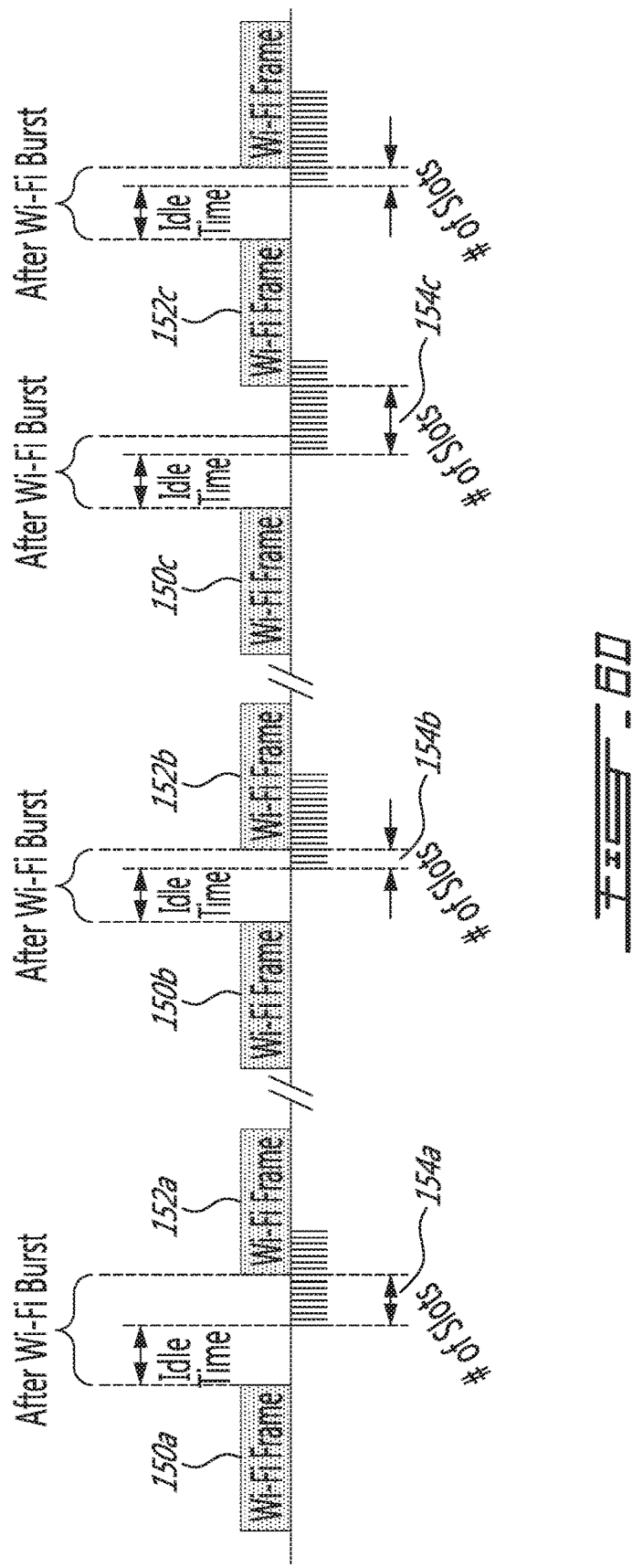

FIG. 6D shows the monitoring of certain WLAN (e.g. Wi-Fi) frames that occur after the transmission of another WLAN frame to estimate the number of active WLAN devices. In this example, the access node 60 is configured to determine a start time 154a, 154b, 154c for each of WLAN frame 152a, 152b, 152c that occurs after a previously transmitted WLAN frame 150a, 150b, 150c (in consecutive WLAN frame pairs). Based on the start time determined for one or more of these WLAN frames 152a, 152b, 152c (and their respective selection probability function), a corresponding number of active WLAN devices can be estimated.

Figure 6E:
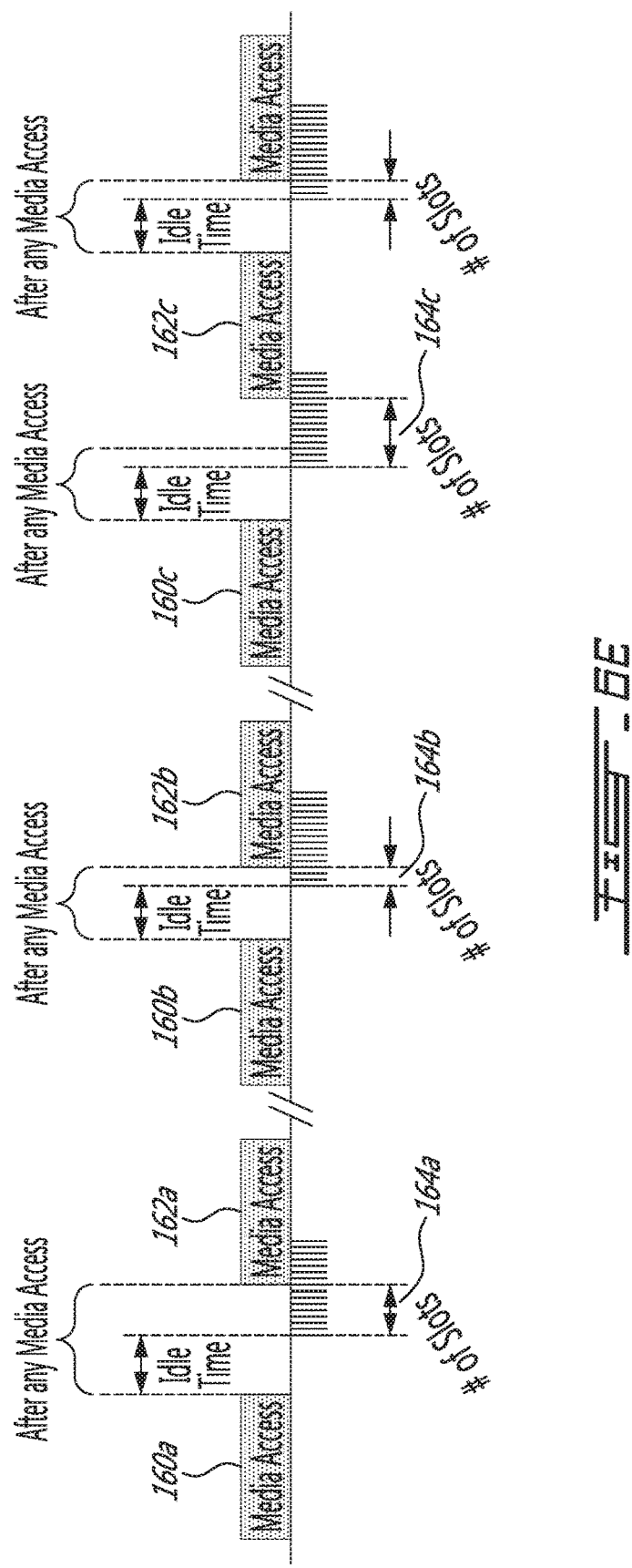

FIG. 6E shows the monitoring of certain media access frames that occur after the transmission of another access frame to estimate the number of active wireless devices in a medium in which transmissions are conducted based on some form of contention algorithm. In this example, the access node 60 is configured to determine a start time 164a, 164b, 164c for each media access frame 162a, 162b, 162c that occurs after a previously transmitted media access frame 160a, 160b, 160c (in consecutive media access frame pairs). Based on the start time determined for one or more of these media access frames 162a, 162b, 162c (and their respective selection probability function), a corresponding number of active devices in the medium can be estimated.

In some implementations, to further improve the active device estimation, the access node is configured to exclude retransmissions. When a collision occur between a (scheduled) LAA-LTE transmission and Wi-Fi or other contention-based transmission in the shared medium, the resulting contention-based transmission that follows the LAA-LTE transmission will, in general, be a retransmission performed using a greater Contention Window size (e.g. $CW_{min}+1$) *2−1 or [0-31] slot times for best effort traffic). As a larger Contention Window size is used, retransmissions may be excluded as they do not exhibit the same slot time or start time probabilities as those described above in relation to "first-time" transmissions). FIG. 6F shows an example where certain but not all WLAN (e.g. Wi-Fi) frames that occur after the transmission of an LAA-LTE frame are monitored to estimate the number of active WLAN devices. In this example, the access node 60 is configured to monitor energy in the medium to determine a start time 174a, 174c only for each of the WLAN frames 172a, 172c that occur after an LAA-LTE frame 170a, 170c but not for WLAN frame 172b as it is likely a retransmission of WLAN frame 172d which collided with LAA-LTE frame 170b. In the example of FIG. 6F, the access node 60 is configured to monitor for RF energy before the start of each LAA-LTE frame 170a, 170b, 170c and when RF energy is detected (e.g. prior to the start of LAA-LTE frame 170b), the access node is configured not to consider WLAN frame 172b and to determine a start time only for WLAN frames 172a, 172c that are not retransmissions. Based on the start time determined for those WLAN frames 172a, 172c (and their respective selection probability function), a corresponding number of active WLAN devices can be estimated.

FIG. 7 shows an example of a method 300 for an access node in an LAA-LTE network (e.g. the access node 60 in the LAA-LTE network of FIG. 1) configured to control its LAA-LTE transmissions (uplink or downlink) in a medium also used by other networks or devices. The method 300 begins at step 302. At step 304, the access node determines whether an LAA-LTE or other media access transmission in the medium had ended. If an on-going LAA-LTE/media access transmission has ended, the process moves to step 306 where a timer in the access node is started (e.g. set to 0). If, on the other hand, the there is no ongoing LAA-LTE/ media access transmission or an on-going LAA-LTE/media access transmission has not ended, the access node continues to monitor for the end of an LAA-LTE/media access transmission in the medium. After the timer has been set, the access node at step 308 determines whether a subsequent contention-based transmission (e.g. a WLAN transmission) has started by determining whether (Radio Frequency) energy or a carrier is detected in the medium. In some implementations, a determination that (RF) energy is detected may be based on a particular level or threshold (e.g. −62 dBm or the "THRESH_62" threshold). In other implementations, as an alternative to energy detection, the access node uses Carrier Sense (CS) to detect the present of a carrier in the medium. As is well-known, there are many ways to implement CS detection including, for example, in the frequency or time domain or a combination of both. In another example, CS may be determined by monitoring (sampling) for the "preamble" time-domain patterns in Wi-Fi packets, or by detecting one or more of the pilot tones used in Wi-Fi packets. Other implementations are possible.

At step 310, if no energy or carrier is detected, the access node increments the timer by a value corresponding to a sampling time used for RF energy or CS detection. In some implementations, the timer increment value may be set to correspond to one or more slot times (e.g. 9 µs, 18 µs, etc.). In other implementations, the timer increment value may be set to a fraction of a slot time (e.g. 4.5 µs). Generally, the timer increment may be set to any value to enable a determination of start times within a window of time used for monitoring contention-based transmissions (e.g. the start time monitoring window) after the occurrence of a previous media access transmission (e.g. an LAA-LTE or WLAN transmission). In the example of FIG. 6, the start time monitoring window used corresponds to 15 slot times or 135 82 s. In another example, the monitoring window is set to correspond to an OFF duration of an LAA-LTE period. In yet another example, the monitoring window is set to correspond to an (average) Contention Window size. Other possibilities exist for the monitoring window and timer increment values.

At step 312, the access node determines whether the current timer value is greater than the sum of the idle (e.g. EIFS) time and the monitoring window, which in this example is set to 15 slot times. If the access node determines that the current timer value is greater than the sum of the idle time (e.g. EIFS time) and the monitoring window, the method proceeds to step 314 where statistics (e.g. start time and/or associated probabilities) used for estimating the number of active devices in the medium are updated. In one example, the statistics are updated to reflect the determination that no contention-based transmission occurred within the monitoring window.

If at step 312, the access node determines that the current timer value is not greater than the sum of the idle time (e.g. EIFS time) and the monitoring window (e.g. smaller than or equal to), (indicating that no transmission occurred within the monitoring window), the method goes back to step 308 where the access node continues monitoring the medium for a contention-based transmission in the monitoring window. At that point, if the access node detects (RF) energy and/or the presence of a carrier (indicating the start of a contention-based transmission), the process moves directly to step 314 where the statistics are updated for e.g. by adding/recording the timer value as a start time for the contention-based transmission corresponding to the energy and/or carrier detected at step 308.

In some implementations, the statistics update use an Infinite Impulse Response (IIR) averaging algorithm, such as "AverageRFStartTime[N]=(α)* AverageRFStartTime[N−1]+(α−1)*RFStartTime[N], where α is used to adjust the IIR filter so that decisions are made based on a predetermined number (e.g. 10 (α=0.9), 20 (α=0.95)) of collected start time values "RFStartTime[N].

Based on the statistics collected (e.g. either a start time associated with a contention-based transmission or an indication that no transmission occurred within the monitoring window i.e. no start time), the access node updates as appropriate the current estimated number of devices, using for example, thresholds and/or fraction device estimation methods in the case of partially busy channels. At step 316, the access node determines if the current number of active devices estimated has been updated. If not, the method goes back to step 304 where the process is repeated again for another LTE/media access transmission. If, the current number of active devices has been updated, the access node adjusts the LAA-LTE ON/OFF durations (or duty cycle) used for subsequent LAA-LTE transmissions based on the updated number of active devices estimated.

FIG. 8 shows another example of a method 400 for an access node configured to control transmissions in a first wireless network and where the first wireless network transmissions occur in a frequency band used for contention-based transmissions in a second wireless network. The method 400 begins at step 402 where after a first wireless network transmission in the first wireless network, the access node determines a start time of a contention-based transmission in the second wireless network. Then at step 404, the access node estimates a number of active wireless devices operating in the second wireless based on the start time. The method continues at step 406 where the access node adjusts a transmission time duration for a subsequent first wireless network transmission based on the number of active wireless devices estimated.

According to principles of the present disclosure, there are many possible algorithms can be used to estimate the number of active devices based on the statistics (e.g. start time values) obtained. Table 1 below shows a first example.

TABLE 1

Probability of RF Start of Slot time Occurring (PDF)

| RF Start TS | # of Active Clients with Full Buffer | | | | |
| --- | --- | --- | --- | --- | --- |
| | 1 | 2 | 3 | 4 | 5 |
| 0 | 6.2500% | 11.7647% | 17.1123% | 22.1453% | 26.8758% |
| 1 | 6.2500% | 11.0294% | 15.0401% | 18.2472% | 20.7609% |
| 2 | 6.2500% | 10.2941% | 13.1016% | 14.8356% | 15.7541% |
| 3 | 6.2500% | 9.5588% | 11.2968% | 11.8782% | 11.7126% |
| 4 | 6.2500% | 8.8235% | 9.6257% | 9.3426% | 8.5037% |
| 5 | 6.2500% | 8.0882% | 8.0882% | 7.1962% | 6.0042% |
| 6 | 6.2500% | 7.3529% | 6.6845% | 5.4066% | 4.1009% |
| 7 | 6.2500% | 6.6176% | 5.4144% | 3.9414% | 2.6906% |
| 8 | 6.2500% | 5.8824% | 4.2781% | 2.7682% | 1.6797% |
| 9 | 6.2500% | 5.1471% | 3.2754% | 1.8545% | 0.9846% |
| 10 | 6.2500% | 4.4118% | 2.4064% | 1.1678% | 0.5315% |
| 11 | 6.2500% | 3.6765% | 1.6711% | 0.6758% | 0.2563% |
| 12 | 6.2500% | 2.9412% | 1.0695% | 0.3460% | 0.1050% |
| 13 | 6.2500% | 2.2059% | 0.6016% | 0.1460% | 0.0332% |
| 14 | 6.2500% | 1.4706% | 0.2674% | 0.0433% | 0.0066% |
| 15 | 6.2500% | 0.7353% | 0.0668% | 0.0054% | 0.0004% |

The access node estimates the number of active devices based on the probability that RF energy starts in a particular slot time or bin over multiple monitoring windows. In the example of Table 1, if the calculated probability that RF energy is first detected in any particular slot time is approximately 6%, the number of active devices estimated by the access node is 1. Similarly, if the calculated probability that RF energy is first detected in slot time 0, 5 and 10 is approximately 12%, 8% and 4% respectively, the number of actives estimated by the access node is 2. In yet another example, if the calculated probability that RF energy is first detected in slot time 0, 5 and 10 is approximately 27%, 6% and 0.5% respectively, the number of actives estimated by the access node is 5. By using probabilities for multiple slot times multiple monitoring windows, the accuracy of the active device estimation may be improved but the present embodiments are not limited as such, and generally, the number of active devices can be estimated based on the probabilities for one or more slot times over one or more monitoring windows.

Table 2 below shows another example to estimate the number of active devices.

TABLE 2

Probability of RF Start <= Specified Slot time (CDF)

| RF Start TS | # of Active Clients with Full Buffer | | | | |
|---|---|---|---|---|---|
| | 1 | 2 | 3 | 4 | 5 |
| 0 | 6.2500% | 11.7647% | 17.1123% | 22.1453% | 26.8758% |
| 1 | 12.5000% | 22.7941% | 32.1524% | 40.3925% | 47.6366% |
| 2 | 18.7500% | 33.0882% | 45.2540% | 55.2282% | 63.3907% |
| 3 | 25.0000% | 42.6471% | 56.5508% | 67.1064% | 75.1033% |
| 4 | 31.2500% | 51.4706% | 66.1765% | 76.4490% | 83.6070% |
| 5 | 37.5000% | 59.5588% | 74.2647% | 83.6451% | 89.6112% |
| 6 | 43.7500% | 66.9118% | 80.9492% | 89.0517% | 93.7121% |
| 7 | 50.0000% | 73.5294% | 86.3636% | 92.9931% | 96.4027% |
| 8 | 56.2500% | 79.4118% | 90.6417% | 95.7612% | 98.0824% |
| 9 | 62.5000% | 84.5588% | 93.9171% | 97.6157% | 99.0670% |
| 10 | 68.7500% | 88.9706% | 96.3235% | 98.7835% | 99.5985% |
| 11 | 75.0000% | 92.6471% | 97.9947% | 99.4593% | 99.8548% |
| 12 | 81.2500% | 95.5882% | 99.0642% | 99.8054% | 99.9598% |
| 13 | 87.5000% | 97.7941% | 99.6658% | 99.9513% | 99.9930% |
| 14 | 93.7500% | 99.2647% | 99.9332% | 99.9946% | 99.9996% |
| 15 | 100.0000% | 100.0000% | 100.0000% | 100.0000% | 100.0000% |

In that example, the access node estimates the number of active devices based on an average time that the monitoring window is free. In that example, with one active full buffer device, the average (approx. 50%) free time (and therefore the average start time) will be 7 slot times of 9 microseconds each or 63 microseconds. With two active full buffer devices, the average will be approximately 4 slot times of 9 microseconds each or 36 microseconds. With three active full buffer devices, the average will be approximately 2.5 slot times of 9 microseconds each or 22.5 microseconds. With four active full buffer devices, the average will be approximately 1.65 slot times of 9 microseconds each or 14.8 microseconds. Thus, averaging the start time can be used to determine the number of active Wi-Fi clients. In some implementations, characterization may be useful to calibrate these values. A sampling algorithm with sufficient resolution to determine the start of Wi-Fi packets, such as 1 microsecond resolution, or 4.5 microsecond resolution, would be able to generate reliable averaged measurements to enable the statistics to be collected, and the number of active Wi-Fi clients determined.

The embodiments described above work well to estimate the number of active devices using a Contention Window configured for Best Effort traffic (e.g. $CW_{min}$=15 slot times). In some implementations, it may be more efficient to process the statistics collected based on the type of traffic observed. Voice and video traffic typically use smaller contention windows of for example $CW_{min}$=5 and $CW_{min}$=9 respectively and as such, voice clients may increase the probabilities that a particular transmission begins in slot times (0-5) and video clients may increase the probabilities for slot times (0-9). As voice and video applications become more prominent, the statistics of traffic generated by these applications may affect the slot time or start time statistics collected. In some implementations, the probabilities associated with the Contention Window slot times are processed in separate slot time or bin groups, for example for bins (0-5), (6-9) and (10-15). By grouping the slot times or bins, the total number and/or types of Wi-Fi clients may be more accurately estimated according to their over-the-air priority (as represented by the minimum CW size, $CW_{min}$, used). For example, the probabilities of bins (10-15) would be indicative of the number of 'best effort" clients. Similarly, the probabilities of bins (6-9) would indicate the number of 'best effort'+'video' clients. The probabilities of bins (1-5) —where bin 0 statistics are excluded as they would include transmissions from beacons—would indicate the number of 'best effort'+'video'+'voice' clients. As is readily apparent to those skilled in the art, by treating each of these groups of probabilities of bins as separate equations, then it would be possible to solve for the number of 'best effort', 'video' and 'voice' clients. Furthermore, the equations are partially independent—in calculating the number of 'best effort' clients using bins (10-15), the result may be applied as input along with the probabilities of bins (6-9) to calculate the number of 'video' clients. The estimated numbers of 'best effort' and 'video' clients may then be used, along with the probabilities of bins (1-5) to estimate the number of 'voice' clients.

There are many ways in which the access node may adjust or control its transmission duty cycle (e.g. ON/OFF durations) to enable the sharing of spectrum resources with other networks or devices operating with contention-based transmissions. Table 2 below shows one example where the duty cycle of an eNodeB access node is adjusted based in part on the number of active Wi-Fi clients estimated and the number of LTE clients or UEs served by the eNodeB.

| eNodeB DUTY CYCLE | # LTE ACTIVE UEs | # Wi-Fi ACTIVE DEVICES | LTE PER UE DUTY CYCLE | Wi-Fi PER DEVICE DUTY CYCLE |
|---|---|---|---|---|
| 10% | 0 | 1 | N/A | 90% |
| 50% | 1 | 1 | 50% | 50% |
| 33% | 1 | 2 | 33.3% | 33.3% |
| 66.7% | 2 | 1 | 33.3% | 33.3% |
| 40% | 2 | 3 | 20% | 20% |
| 37.5% | 3 | 5 | 12.5% | 12.5% |
| 90% | 3 | 0 | 33.3% | N/A |

In some implementations, a minimum or maximum LTE duty cycle independent of the number of active LTE and/or Wi-Fi clients may be used to meet standardized requirements and/or design constraints. For example, even if there are no Wi-Fi devices, a maximum LTE duty cycle which is less that 100% may be used to accommodate the Wi-Fi static loading of the channel e.g. Wi-Fi beacons, probes and other control transmissions from non-active Wi-Fi clients.

Figure 9A:
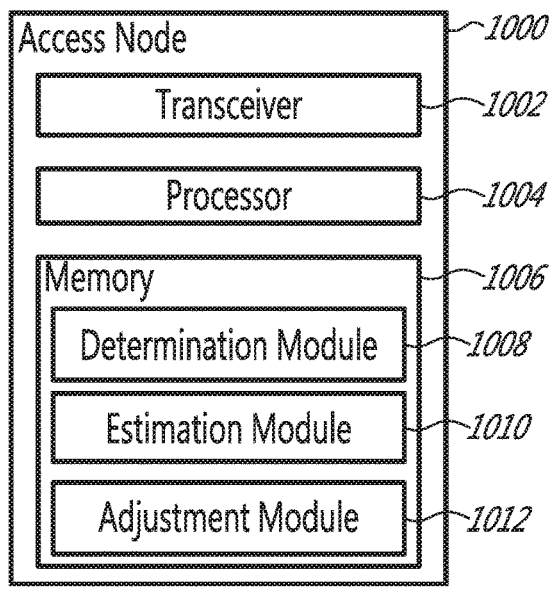
FIG. 9A-9B shows a block diagram of exemplary embodiments of an access node and a wireless device configured in accordance with principles of the present disclosure.
Figure 9B:
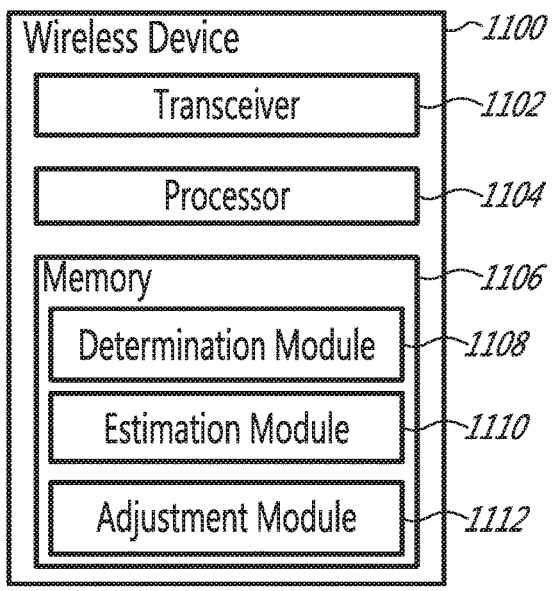
Figure 10A:
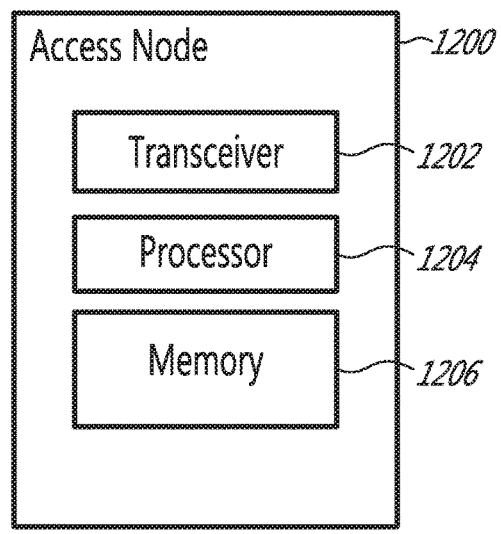
FIG. 10A-10B shows a block diagram of other exemplary embodiments of an access node and a wireless device configured in accordance with principles of the present disclosure.
Figure 10B:
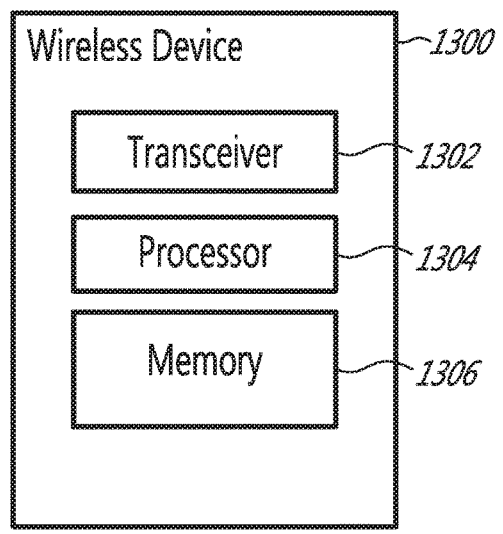

FIGS. 9A-B are block diagrams of exemplary embodiments of respectively an access node 1000 and a wireless device (such as those described in relation to FIGS. 1-8)) configured to control transmissions in a first wireless network (e.g. an LTE network) in a frequency band used for contention-based transmissions in another wireless network (e.g. a Wi-Fi network) in accordance with the principles of the present disclosure.

As illustrated in FIG. 9A, access node 1000 includes a transceiver 1002, one or more processor(s) 1004, memory 1006 which includes a determination module 1008, an estimation module 1010 and an adjustment module 1012. In one embodiment, the transceiver 1002 may be replaced by a transmitter and a receiver (not shown). The determination module 1006 is configured to perform the determination functionality described above which, as noted above includes determining a start time for one or more contention-based transmissions in the second wireless networks. The estimation module 1010 is configured to perform the estimation functionality described above, which includes estimating a number of active wireless devices operating in the second wireless network based on the start time. The adjustment module 1012 is configured to perform the adjustment functionality described above which includes adjusting a transmission time duration (e.g. an ON and/or OFF duration of a transmission period) for a subsequent first wireless network transmission based on the number of active wireless devices estimated.

The determination module 1008, estimation module 1010 and the adjustment module 1012 are implemented at least partially in the memory 11006 in the form of software or (computer-implemented) instructions executed by the processor(s) 1004 within the access node 1000 or distributed across two or more nodes (e.g., the access node 1000 and another node). In another example, the processor(s) 1004 includes one or more hardware components (e.g., Application Specific Integrated Circuits (ASICs)) that provide some or all of the determination, estimation and adjustment functionality described above. In another embodiment, the processor(s) 1004 include one or more hardware components (e.g., Central Processing Units (CPUs)), and some or all of the determination, estimation and adjustment functionality described above is implemented in software stored in, e.g., the memory 1006 and executed by the processor 1004. In yet another embodiment, the processor(s) 1004 and memory 1006 form processing means (not shown) configured to perform the determination, estimation and adjustment functionality described above.

As illustrated in FIG. 9B, wireless device 1100 includes a transceiver 1102, one or more processor(s) 1104, memory 1106 which includes a determination module 1108, an estimation module 1110 and an adjustment module 1112. In one embodiment, the transceiver 1102 may be replaced by a transmitter and a receiver (not shown). The determination module 1106 is configured to perform the determination functionality described above which, as noted above includes determining a start time for one or more contention-based transmissions in the second wireless networks. The estimation module 1110 is configured to perform the estimation functionality described above, which includes estimating a number of active wireless devices operating in the second wireless network based on the start time. The adjustment module 1112 is configured to perform the adjustment functionality described above which includes adjusting a transmission time duration (e.g. an ON and/or OFF duration of a transmission duty cycle) for a subsequent first wireless network transmission based on the number of active wireless devices estimated.

The determination module 1108, estimation module 1110 and the adjustment module 1112 are implemented at least partially in the memory 1106 in the form of software or (computer-implemented) instructions executed by the processor(s) 1104 within the wireless device 1100 or distributed across two or more nodes (e.g., the wireless device 1100 and another node or device). In another example, the processor(s) 1104 includes one or more hardware components (e.g., Application Specific Integrated Circuits (ASICs)) that provide some or all of the determination, estimation and adjustment functionality described above. In another embodiment, the processor(s) 1104 include one or more hardware components (e.g., Central Processing Units (CPUs)), and some or all of the determination, estimation and adjustment functionality described above is implemented in software stored in, e.g., the memory 1106 and executed by the processor 1104. In yet another embodiment, the processor(s) 1104 and memory 1106 form processing means (not shown) configured to perform the determination, estimation and adjustment functionality described above.

FIGS. 9A-B show a variant for each of the access node and wireless device examples of FIGS. 8A-B, denoted respectively as access node 1200, and wireless device 1300. Each of the node 1200 and device 1300 includes a transceiver 1202, 1302 and circuitry containing (computer-implemented) instructions which when executed by one or more processor(s) 11204, 1304 cause their respective node 1200 and device 1300 to perform some or all of the determination, estimation and adjustment functionality described above. In yet another variant, the circuitry includes the respective memory 1206, 1306 and processor(s) 1204, 1304 which, similarly to the example access node 1000 and device 1100 of FIGS. 8A-B may be implemented in many different ways. In one example, the memories 1206, 1306 contain instructions which, when executed, cause the respective node 1200 and device 1300 to perform some or all of their determination, estimation and adjustment functionality described above. Other implementations are possible.

Other embodiments

The following is also noted in accordance with other contemplated embodiments.

In one aspect of the present disclosure, there is provided a method for a network node configured to control transmissions in a first wireless network, the first wireless network transmissions occurring in a frequency band used for contention-based transmissions in a second wireless network. The method includes after a first wireless network transmission in the first wireless network, determining a start time of a contention-based transmission in the second wireless network, estimating a number of active wireless devices operating in the second wireless network based on the start time, and adjusting a transmission time duration for a subsequent first wireless network transmission based on the number of active wireless devices estimated.

In some embodiments, the first wireless network includes a Radio Access Network (RAN) and the second wireless network comprises a Wireless Local Area Network (WLAN). In other embodiments, the active wireless devices operate in accordance with a contention-based protocol. In yet other embodiments, the method includes after each of a plurality of first network transmissions, determining a start time for a respective subsequent contention-based transmission in the second wireless network. In yet other embodiments, the start time determination is only performed when the respective subsequent contention-based transmission is not a control transmission or a re-transmission. In yet other embodiments, estimating a number of active wireless devices includes estimating the number of active wireless devices based on a probability function for the start time, the start time corresponds to a particular slot time in a contention window, the probability function is indicative of the probability that a contention-based transmission starts during the particular slot time, the probability function is indicative of the number of active wireless devices operating in the second wireless network, and/or the number of active wireless devices estimated is one when the probability function for the start time is evenly distributed across all slot times of the contention window.

In yet other embodiments, the method further includes detecting energy associated with the contention-based transmission in the frequency band where the determining includes determining the start time for the contention-based transmission based on the energy detected. In yet other embodiments, the first wireless network transmission and contention-based transmission occur in overlapping channels of the frequency band. In yet other embodiments, the adjusting includes increasing the transmission time duration for the subsequent first wireless network transmission when the number of active wireless devices estimated is below a target and decreasing the transmission time duration for the subsequent first wireless network transmission when the number of active wireless devices estimated is above the target.

In yet other embodiments, the number of active wireless devices estimated is zero and the method further includes detecting energy associated with one or more control transmissions in the second wireless network, and adjusting the transmission time duration for the subsequent first wireless network transmission based on the one or more control transmissions detected.

In another broad aspect of the present disclosure, there is provided a network node in a first wireless network configured to perform any of the method embodiments described above. In some embodiments, the network node includes an access node (e.g. an eNodeB) or a wireless device. In yet another broad aspect of the present disclosure, there is provided a computer program product configured to implement any of the above method embodiments described above.

In yet another broad aspect of the present disclosure, there is provided a network node configured to control transmissions in a first wireless network where the first wireless network transmissions occur in a frequency band used for contention-based transmissions in a second wireless network. The network node includes a determination module for determining, after a first wireless network transmission in the first wireless network, a start time of a contention-based transmission in the second wireless network. The network node also includes an estimation module for estimate a number of active wireless devices operating in the second wireless network based on the start time; and an adjustment module for adjusting a transmission time duration for a subsequent first wireless network transmission based on the number of active wireless devices estimated.

Embodiment A—A method for a network node for monitoring for the start of RF energy immediately after an RF busy medium period, determining a start time statistic for the RF energy start and using the statistic to (dynamically) set a percentage of (unlicensed) spectrum sharing for a cellular or 3GPP device.

Embodiment B—Embodiment A wherein binning of the monitored RF energy, to determine the number of active (Wi-Fi) clients in an (unlicensed) spectrum.

Embodiment C—Any of the above embodiments where monitoring the start of RF energy is performed after an RF busy medium period, before and during the contention window, and estimating the number of Wi-Fi user devices based on the a CSMA/CD algorithm.

Embodiment D—Any of the above embodiments where the start of RF energy is equally distributed across all of the slot times during the contention window, indicating a single Wi-Fi client is actively using the spectrum.

Embodiment E—Any of the above embodiments where weighting the above statistic, based on the number of Contention Windows with RF energy starts, to determine the overall traffic load. (This would be the case where this is one Wi-Fi client, but not with a full buffer, but with a partially full buffer, such as during a VoIP or Video session].

Embodiment F—Any of the above embodiments where the RF busy medium period includes a User Equipment (UE) transmission". in that particular example, the LAA-LTE RBS can monitor the start of RF energy after the UE's transmission. This gives more monitoring opportunities, and therefore better/more accurate statistics.

Embodiment G—Any of the above embodiments where the monitoring is performed after any RF busy medium period may include any known or unknown energy burst such as for example an IoT device transmission, a Wi-Fi transmission, a DECT phone transmission, or another LAA-LTE transmission. Regardless, the Wi-Fi behavior can be monitored after any and all RF busy medium periods, so that overall statistics can become quite fine, especially since most Wi-Fi packets are 2-4 milliseconds in duration, and therefore, an LAA-LTE radio using this technique would be able to use all visible energy bursts to statistically assess the number of active user devices.

Embodiment H—A method of monitoring the power before a transmission (RF busy media period) to determine if there was a collision. This would be possible with the LAA-LTE transmitter which decided to transit (no LBT) such as in the FCC regulatory domain, and found that there was energy present just before transmission started. This information can be used to determine the degree of collisions, which affects the collected statistics since $CW_{max}$ would increase from 15 to 31 after a collision.

Embodiment I—Any of the above embodiments where a start time logarithm slope is used to determine the number of active clients. However, other possibilities exist e.g. using a simple linear regression to the data, and determine the slope.

Embodiment J—Any of the above embodiments where a raw start time is used instead, with a least squares calculation to determine the best fit of the curves for 0, 1, 2, 3, up to N clients.

Embodiment K—Any of the above embodiments with a method of excluding or rejecting from the monitoring beacons which access the medium immediately after an RF busy medium period. Beacons are transmitted at regular intervals of 102.4 ms or other defined time period (N*a defined number of Time Units).

Embodiment L—Any of the above embodiments with a method of excluding or rejecting VoIP and or Video packets from the monitoring. Such packets have higher QoS and a smaller Contention Window size, $CW_{max}$) and may therefore skew the results, tending to favor the earlier timeslots. Stated in another way, the monitoring includes monitoring for the start of RF energy associated with contention-based transmissions other than short packet transmissions (<200 us) after the RF Busy Medium period, and determining the start time statistic for the RF energy start based on the monitoring. These short packets may still be used to estimate overall medium utilization, but they need not be counted in the statistics to be used to ascertain the number of active clients.

Embodiment M—Any of the above embodiments where slope calculation use logarithms.

Embodiment N—Any of the above embodiments further comprising adjusting a transmission (Tx) duty cycle for the network node based on above data.

Embodiment O—Any of the above embodiments further comprising adjusting a reception (Rx) duty cycle based on above data.

Embodiment P—Any of the above embodiments further comprising using variable time constants for LAA-LTE reaction time. For example, the LAA-LTE system may be able to detect the RF media changing from no active clients to one active client as quickly as 10-100 milliseconds, and to act on this change quickly, dropping the LAA-LTE transmitter (or transmitter+receiver) duty cycle from, say 90% to 50% in 100 milliseconds. It may take the algorithm slightly longer (possibly 250 milliseconds) to detect that there are 2 active clients, resulting in the algorithm changing from 50% to 33% Tx or Tx+Rx or Rx duty cycles. For 3 active clients, it may take 500 milliseconds or longer, before the LAA-LTE radio adjusts its duty cycle, and possibly 4 or more clients may have longer time constants any may not result in reductions below 25% transmit duty cycle (or whatever minimum value is defined by the LAA-LTE service provider). These time approximations assume that LAA-LTE uses a short Tx/Rx duty cycle, in the order of a few milliseconds to tens of milliseconds.

Regardless, the amount of packet traffic from the Wi-Fi devices, with typical 5 GHz burst transmissions in the range of a few hundred microseconds to a few milliseconds means that multiple measurements can be made using these "media access" events as input to the algorithm to calculate the number of active clients operating collision avoidance or contention-based protocols.

Embodiment Q—Any of the above embodiments with a method to randomize the transmission window of LAA-LTE bursts to avoid aliasing with Wi-Fi beacons.

Embodiment R—Any of the above embodiments with console messaging stating statistics such as average channel receiver utilization, average transmitter utilization, and estimated number of active clients. Average channel receiver utilization would be calculated as the period of time during the LAA-LTE receive window during which the RF media is considered busy. This "busy" period may be calculated as either RF energy, or the detection of Wi-Fi or LAA-LTE signatures such as pilot tones used in carrier sense mechanisms, or the combination of both. This may be useful for compliance with FCC regulations (should the FCC force a LBT sharing arrangement/etiquette).

Embodiment S—Any of the above embodiments where usage of above statistics is for LAA-LTE FEC and HARQ feedback loop. Use more FEC and/or HARQ for conditions of higher client traffic.

Embodiment T—Any of the above embodiments for 5G systems, rather than 3GPP LAA-LTE.

Embodiment U—Any of the above embodiments applied to licensed spectrum, allowing operators to "share" spectrum in a meaningful and controlled manner, which is not as uncontrolled as Wi-Fi.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings.

The invention claimed is:

1. A method for a network node configured to control transmissions in a first wireless network, the first wireless network transmissions occurring in a frequency band used for contention-based transmissions in a second wireless network, the method comprising:
    after a first wireless network transmission in the first wireless network, determining a start time of a contention-based transmission in the second wireless network;
    estimating a number of active wireless devices operating in the second wireless network based on the start time; and
    adjusting a transmission time duration for a subsequent first wireless network transmission based on the number of active wireless devices estimated.

2. The method of claim 1 wherein the first wireless network comprises a Radio Access Network (RAN) and the second wireless network comprises a Wireless Local Area Network (WLAN).

3. The method of claim 1 wherein the active wireless devices operate in accordance with a contention-based protocol.

4. The method of claim 1 wherein the determining comprises after each of a plurality of first network transmissions, determining a start time for a respective subsequent contention-based transmission in the second wireless network.

5. The method of claim 1 wherein the start time determination is only performed when the respective subsequent contention-based transmission is not a control transmission or a re-transmission.

6. The method of claim 1 wherein estimating a number of active wireless devices comprises estimating the number of active wireless devices based on a probability function for the start time.

7. The method of claim 6 wherein the start time corresponds to a particular slot time in a contention window and wherein the probability function is indicative of the probability that a contention-based transmission starts during the particular slot time.

8. The method of claim 6 wherein the probability function is indicative of the number of active wireless devices operating in the second wireless network.

9. The method of claim 6 wherein the number of active wireless devices estimated is one when the probability function for the start time is evenly distributed across all slot times of a contention window.

10. The method of claim 1 further comprising detecting energy associated with the contention-based transmission in the frequency band, and wherein the determining comprises determining the start time for the contention-based transmission based on the energy detected.

11. The method of claim 1 wherein the first wireless network transmission and contention-based transmission occur in overlapping channels of the frequency band.

12. The method of claim 1 wherein the adjusting comprises increasing the transmission time duration for the subsequent first wireless network transmission when the number of active wireless devices estimated is below a target and decreasing the transmission time duration for the subsequent first wireless network transmission when the number of active wireless devices estimated is above the target.

13. The method of claim 1 wherein the number of active wireless devices estimated is zero, the method further comprising:
   detecting energy associated with one or more control transmissions in the second wireless network, and
   adjusting the transmission time duration for the subsequent first wireless network transmission based on the one or more control transmissions detected.

14. A network node configured to control transmissions in a first wireless network, the first wireless network transmissions occurring in a frequency band used for contention-based transmissions in a second wireless network, the network node comprising circuitry containing instructions which, when executed, cause the network node to:
   after a first wireless network transmission in the first wireless network, determine a start time of a contention-based transmission in the second wireless network;
   estimate a number of active wireless devices operating in the second wireless network based on the start time; and
   adjust a transmission time duration for a subsequent first wireless network transmission based on the number of active wireless devices estimated.

15. The network node of claim 14 wherein the first wireless network comprises a Radio Access Network (RAN) and the second wireless network comprises a Wireless Local Area Network (WLAN).

16. The network node of claim 14 wherein the active wireless devices operate in accordance with a contention-based protocol.

17. The network node of claim 14 wherein the instructions are further configured to cause the network node to, after each of a plurality of first network transmissions, determine a start time for a respective subsequent contention-based transmission in the second wireless network.

18. The network node of claim 14 wherein the start time determination is only performed when the respective subsequent contention-based transmission is not a control transmission or a re-transmission.

19. The network node of claim 14 wherein the instructions are further configured to cause the network node to estimate the number of active wireless devices based on a probability function for the start time.

20. The network node of claim 19 wherein the start time corresponds to a particular slot time in a contention window and wherein the probability function is indicative of the probability that a contention-based transmission starts during the particular slot time.

21. The network node of claim 19 wherein the probability function is indicative of the number of active wireless devices operating in the second wireless network.

22. The network node of claim 19 wherein the number of active wireless devices estimated is one when the probability function for the start time is evenly distributed across all slot times of a contention window.

23. The network node of claim 14 wherein the instructions are further configured to cause the network node to detect energy associated with the contention-based transmission in the frequency band, and determine the start time for the contention-based transmission based on the energy detected.

24. The network node of claim 14 wherein the first wireless network transmission and contention-based transmission occur in overlapping channels of the frequency band.

25. The network node of claim 14 wherein the instructions are further configured to adjust the transmission time duration by increasing the transmission time duration for the subsequent first wireless network transmission when the number of active wireless devices estimated is below a target and decreasing the transmission time duration for the subsequent first wireless network transmission when the number of active wireless devices estimated is above the target.

26. The network node of claim 14 wherein the number of active wireless devices estimated is zero, the instructions being further configured to cause the network node to:
   detect energy associated with one or more control transmissions in the second wireless network, and
   adjust the transmission time duration for the subsequent first wireless network transmission based on the one or more control transmissions detected.

27. The network node of claim 14 wherein the network node comprises one of an access node and a wireless device.

28. The network node of claim 14 wherein the network node comprises an eNodeB.

29. A non-transitory computer readable memory configured to store executable instructions for a network node, the network node configured to control transmissions in a first wireless network, the first wireless network transmissions occurring in a frequency band used for contention-based transmissions in a second wireless network, the executable instructions when executed by a processor cause the network node to:
   after a first wireless network transmission in the first wireless network, determine a start time of a contention-based transmission in the second wireless network;
   estimate a number of active wireless devices operating in the second wireless network based on the start time; and
   adjust a transmission time duration for a subsequent first wireless network transmission based on the number of active wireless devices estimated.

* * * * *